US012044543B2

(12) United States Patent
    Marmet

(10) Patent No.: US 12,044,543 B2
(45) Date of Patent: Jul. 23, 2024

(54) DYNAMIC STREETVIEW WITH VIEW IMAGES ENHANCEMENT

(71) Applicant: CENTRE NATIONAL D'ETUDES SPATIALES, Paris (FR)

(72) Inventor: François-Xavier Marmet, Muret (FR)

(73) Assignee: CENTRE NATIONAL D'ETUDES SPATIALES, Paris (FR)

( * ) Notice: Subject to any disclaimer, the term of this patent is extended or adjusted under 35 U.S.C. 154(b) by 270 days.

(21) Appl. No.: 16/958,687

(22) PCT Filed: Dec. 19, 2018

(86) PCT No.: PCT/EP2018/085944
    § 371 (c)(1),
    (2) Date: Jun. 27, 2020

(87) PCT Pub. No.: WO2019/129583
    PCT Pub. Date: Jul. 4, 2019

(65) Prior Publication Data
    US 2020/0340823 A1    Oct. 29, 2020

(30) Foreign Application Priority Data
    Dec. 28, 2017    (EP) .................................... 17306946

(51) Int. Cl.
    *G01C 21/36*        (2006.01)
    *G06F 16/29*        (2019.01)
    *G06Q 30/0241*      (2023.01)
(52) U.S. Cl.
    CPC ......... *G01C 21/3691* (2013.01); *G06F 16/29* (2019.01); *G06Q 30/0241* (2013.01)

(58) Field of Classification Search
    CPC . G01C 21/3691; G01C 21/3647; G06F 16/29; G06Q 30/0241; G06T 11/00
    See application file for complete search history.

(56) References Cited

U.S. PATENT DOCUMENTS 8,995,716 B1    3/2015 Zomet et al.
9,286,545 B1 *  3/2016 Anguelov ............. G06T 11/003
                (Continued)

FOREIGN PATENT DOCUMENTS

CN        104199944 B *  1/2018  ....... G06F 17/30247
WO        2015/000434 A1  1/2015

OTHER PUBLICATIONS

Translation of CN-104199944-B (Year: 2018).*
(Continued)

*Primary Examiner* — Kenneth J Malkowski
*Assistant Examiner* — Ibrahim Abdoalatif Alsomairy
(74) *Attorney, Agent, or Firm* — Burris Law, PLLC

(57) ABSTRACT

A user computing device, method and computer program to display a view to the user are provided. The invention allows a user to display a number of different views with photorealistic rendering of how the view should look like at a view time, based solely on view position, and descriptors of the view. In an aspect, the invention deduces from view position and view time the view descriptors (weather parameters, traffic parameters . . . ); selects, in a collection of images, an image of the view based on view position; modifies the image to match descriptors of the view (for example, by adding a rain effect if the image in the collection is under sunshine and the view should be displayed under rain). Thus, the invention allows displaying photorealistic images of how a view should look like at any time.

10 Claims, 12 Drawing Sheets

(56) References Cited

U.S. PATENT DOCUMENTS

| | | | |
|---|---|---|---|
| 2010/0250581 A1* | 9/2010 | Chau | G06F 16/58 |
| | | | 707/769 |
| 2014/0277939 A1 | 9/2014 | Ren et al. | |
| 2014/0297575 A1 | 10/2014 | Rapoport et al. | |
| 2014/0324843 A1* | 10/2014 | Rapoport | G06F 16/29 |
| | | | 707/724 |
| 2017/0251339 A1* | 8/2017 | Addepalli | H04W 48/02 |
| 2019/0271550 A1* | 9/2019 | Breed | G08G 1/205 |

OTHER PUBLICATIONS

Kang, et al., "Automatic single-image-based rain streaks removal via image decomposition", IEEE Transactions on Image Processing, vol. 21, No. 4, pp. 1742-1755, 2012.

Wikipedia, List of street view services, available at https://en.wikipedia.org/wiki/List_of_street_view_services. Dec. 28, 2021.

* cited by examiner

610

620

DYNAMIC STREETVIEW WITH VIEW IMAGES ENHANCEMENT

CROSS-REFERENCE TO RELATED APPLICATIONS

This application is a National Stage of International patent application PCT/EP2018/085944, filed on Dec. 19, 2018, which claims priority to foreign European patent application No. EP 17306946.9, filed on Dec. 28, 2017, the disclosures of which are incorporated by reference in their entirety.

FIELD OF THE INVENTION

The present invention relates to the field of digital imaging. More specifically, it relates to the modification of images to provide as accurate a view of an environment as possible to a user.

BACKGROUND PRIOR ART

Digital imaging representation of real life views allows providing a number of interesting user applications. For example, the Google StreetView™ service allows a user to have a view of a place as if the user was standing at this place. The Google StreetView™ service relies on a huge collection of photos taken by cars equipped with cameras that have circulated in a large number of streets and roads, while the cameras took successive images in different directions all around the cars. This allows the Google StreetView™ service having a collection of images for different positions and orientations. The sampling frequency of photos can be very high, i.e there may be a short distance between two successive photos. This allows a user which selects a place in a street and an orientation to view a photo with a position/orientation pair close to the one he selected. The user can then look around to view photos with other orientations in the same position, and "advance" in the street to view photos taken from nearby positions. This allows a user to have an overview of an entire street, or even an entire city, with a realistic sensation of immersion in the street.

Other possible applications comprise having an overview of a place at a given time. For example, a driver may be interested having a realistic overview of the place which he/she is driving to, at the arrival time. This may for example allow the driver finding the right door, by viewing realistic details at a given time. Another useful application would consist in having a realistic overview of a place in different seasons. This may for example allow a user which considers buying a house to have a realistic view of the neighborhood of the house at different times of the year.

Among the list of mapping services that provide 360-degrees such as the one which can be found on the Wikipedia page: https://en.wikipedia.org/wiki/List_of_street_view_services, Google Street View is one of the most comprehensive street view service in the world. It provides street view for more than 70 countries worldwide. Bing Maps Streetside is Microsoft's competing service. We can also mention The Mapillary project that collects crowd-sourced images from its users and OpenStreetCam, created by Telenav, which is also using crowdsourced imagery.

One drawback of the Google StreetView™, or similar services, is that it shows images taken in a context (i.e weather, season, night, day . . . ) which does not often correspond to the context that interests the user. For example, if a driver wishes to have an overview of a place he/she is driving to, and is planning to arrive in summer in a sunny environment, he/she may find difficult to recognize the environment, if the image that is displayed has been taken in a very different context, for example in winter under the snow.

The US patent application published under number US2014/0277939 discloses a solution to define 3D views, wherein the textures are adapted to current values of a set of meteorological parameters (wind, humidity, season, rain, etc. . . . ). The set of meteorological parameters can be determined by sensors onboard a vehicle, or retrieved from a remote weather service. This solution is designed to provide in real-time to the user of a navigation device a 3D view that globally looks like its immediate environment. However, this solution is only adapted to represent the immediate environment of the user, not a distant view. Moreover, patent application published under number US2014/0277939 discloses a solution wherein a view roughly similar to the environment of the user is artificially created using 3D features. The 3D features comprise information such as the positions and heights of buildings, the roads and bridges, etc. . . . . Thus, the solution disclosed in the patent application published under number US2014/0277939 provides to the user a purely artificial view, which lacks a photorealistic aspect and misses a number of features which render a view realistic. Such missing features comprise for example shapes of the trees, shapes and colors of the doors of houses, precise location and sizes of the windows, etc. . . . .

Thus, neither solutions based on a single image view, nor solutions based on 3D rendering provide a suitable solution for providing to users an accurate realistic view of a place at a desired time.

There is therefore a need for a processing device and method, to provide to users views of a desired position at a desired time, which is both photorealistic with all possible details of the view, and tailored to look as close as possible to the view at the desired time.

SUMMARY OF THE INVENTION

The invention discloses a device configured to display a first image representing a view, said device comprising a first processing logic configured to obtain a view position at which the first image should represent the view; an access to a second processing logic configured to obtain one or more image descriptors of the view defining how the first image should represent the view; an access to a third processing logic configured to: select, in a collection of images, said images having associated respective image positions, a second image representing the view based at least on the view position, and the respective images positions of each image in the collection of images; an access to a fourth processing logic configured to: create said first image representing the view based at least on said second image representing the view; modify said first image representing the view using said one or more image descriptors of the view; an association to a display means configured to display said modified first image to the user.

The invention also discloses a device configured to display a first image representing a view, said user device comprising: a first processing logic configured to obtain a view position at which the first image should represent the view; an access to a second processing logic configured to obtain one or more image descriptors of the view defining how the first image should represent the view; an access to a third processing logic configured to: select, in a collection of images, said images having associated with respective image positions and respective image descriptors, said first image representing the view based at least on the view position, the one or more image descriptors of the view, the respective images descriptors and the respective images positions of each image in the collection of images; an association to a display means configured to display said first image to the user.

Advantageously, the first processing logic is further configured to obtain a view time at which the first image should represent the view.

Advantageously, said first processing logic is further configured to calculate the view time based on an initial time, and a travel time to the view position calculated using an initial position, the view position and a description of roads in between.

Advantageously, the second processing logic is configured to obtain the one or more image descriptors of the view based on the view time and the view position.

Advantageously, the device further comprises a memory being associated with the collection of images, and wherein the third processing logic is located onboard the device.

Advantageously, the device further comprises a communication port to communicate with one or more servers wherein said one or more servers comprise one or more memories storing said collection of images, and wherein the third processing logic is located onboard said one or more servers.

Advantageously, the fourth processing logic is located onboard said user computing device.

Advantageously, the fourth processing logic is located onboard said one or more servers.

Advantageously, the device further comprises one or more communication ports to external sensors associated with the view, said processing logic being configured to receive one or more descriptors of the view using said one or more communication ports.

Advantageously, the device further comprises one or more communication ports to services providing timed, geo-referenced predictions of image descriptors of the view, said first logic being configured to receive one or more meteorological descriptors using said one or more communication ports based on the view time and the view position.

Advantageously, the images have further associated therewith respective image descriptors; said third processing logic is further configured to select said second image representing the view based on the one or more image descriptors of the view and said respective image descriptors of each image in the collection of images.

Advantageously, the device is configured to create two or more images representing an animation of the view, said fourth processing logic being configured to add one or more moving effects to said two or more images representing an animation of the view.

The invention also discloses a method to display a first image representing a view, said method comprising: obtaining a view position at which the first image should represent the view; obtaining, a one or more image descriptors of the view defining how the first image should represent the view; selecting, in a collection of images, said images having associated with respective image positions, a second image representing the view based at least on the view position, and the respective images positions; creating said first image representing the view based at least on said second image representing the view; modifying said first image representing the view using the one or more image descriptors of the view; displaying said first image.

The invention also discloses, a computer program product to display a first image representing a view, said computer program product comprising computer code instructions configured to: obtaining a view position at which the first image should represent the view; obtaining one or more image descriptors of the view defining how the first image should represent the view; selecting, in a collection of images, said images having associated with respective image positions, a second image representing the view based at least on the view position, and the respective images positions; creating said first image representing the view based at least on said second image representing the view; modifying said first image representing the view using the one or more image descriptors of the view; displaying said first image to the user.

The invention allows displaying a view as similar as possible to the real life view at a given date/time.

The invention allows photorealistic rendering of views.

The invention is adaptable to any meteorological parameter, any time of the day and any day of the year.

The invention allows a driver to have a realistic overview of a place of arrival taking into account both the time to destination and the predicted meteorological parameters at the arrival time.

The views created using the invention can be further improved, if new images are added to the collection of images, or if the existing images are enriched with metadata comprising information about the image.

BRIEF DESCRIPTION OF THE DRAWINGS

The invention will be better understood and its various features and advantages will emerge from the following description of a number of exemplary embodiments and its appended figures in which.

DETAILED DESCRIPTION OF THE INVENTION

Figure 1:
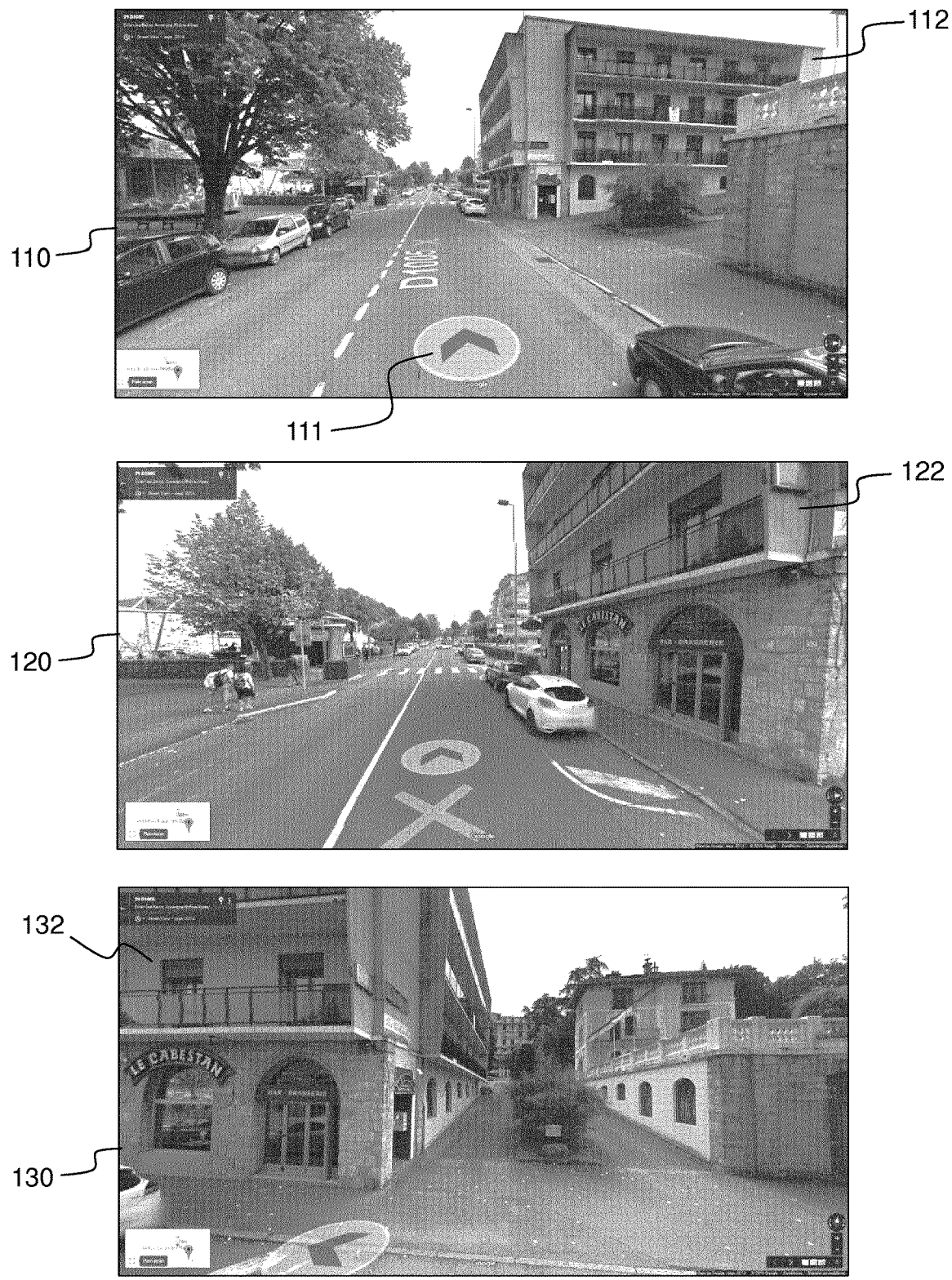
FIG. 1 displays a view of a service to display image view of streets in the prior art.

FIG. 1 displays a view of a service to display image view of streets in the prior art.

The views represented in FIG. 1 may be for example generated by a street viewing service, i.e. a service that allows the user to travel virtually in a street, and look at views of the street, as if he/she were moving in a car and looking in different directions. The street viewing service may be for example the service Google StreetView™, or a similar service.

FIG. 1 displays three successive views 110, 120, and 130 generated by the street viewing service. Each view allows the user to view an existing street, as if he/she were in a car at a position in the street, looking in a direction. When the user is using the street viewing service, he/she may change his/her position in the street. For example, when viewing the view 110, the user can click on the arrow 111, to advance further in the street, and view the view 120. This allows for example having a closer view 122 of the building 112 than what was already present in view 110.

The user can further rotate to have an overview, from the same location, of the street from a different orientation. For example, he/she can use a mouse to rotate the angle of view, and virtually look in a different orientation from the same location in the street. In the example displayed in FIG. 1, the user performed a rotation to the right from the view 120, in order to have the view 130 of the street, wherein the building 132 is a rotated view of the building 122.

Street viewing services of the prior art rely on images that are taken at different locations and orientations in the streets. They are based upon large databases of geo-localized images of views. Each view is tagged with a location and an orientation. When a user is using the street viewing service, the service first determines what is the position and orientation of the view to present to the user. Then the service sends the corresponding image to the user. If the service relies on a database with a sufficiently fine granularity of possible locations and orientations, the street viewing service allows a user viewing virtually any possible view of a street.

A street viewing service of the prior art usually displays to the user the most recent view corresponding to the desired location and orientation of the user. However, the most recent view may correspond to conditions which are very different from the current conditions. For example, the three images 110, 120 and 130 have been taken in a cloudy summer day. Thus, they are not representative of a view of the same street in different conditions, for example at night, under snow, with a different amount of sunlight, or with specific events that may occur in the street, for example a concert.

Figure 2:
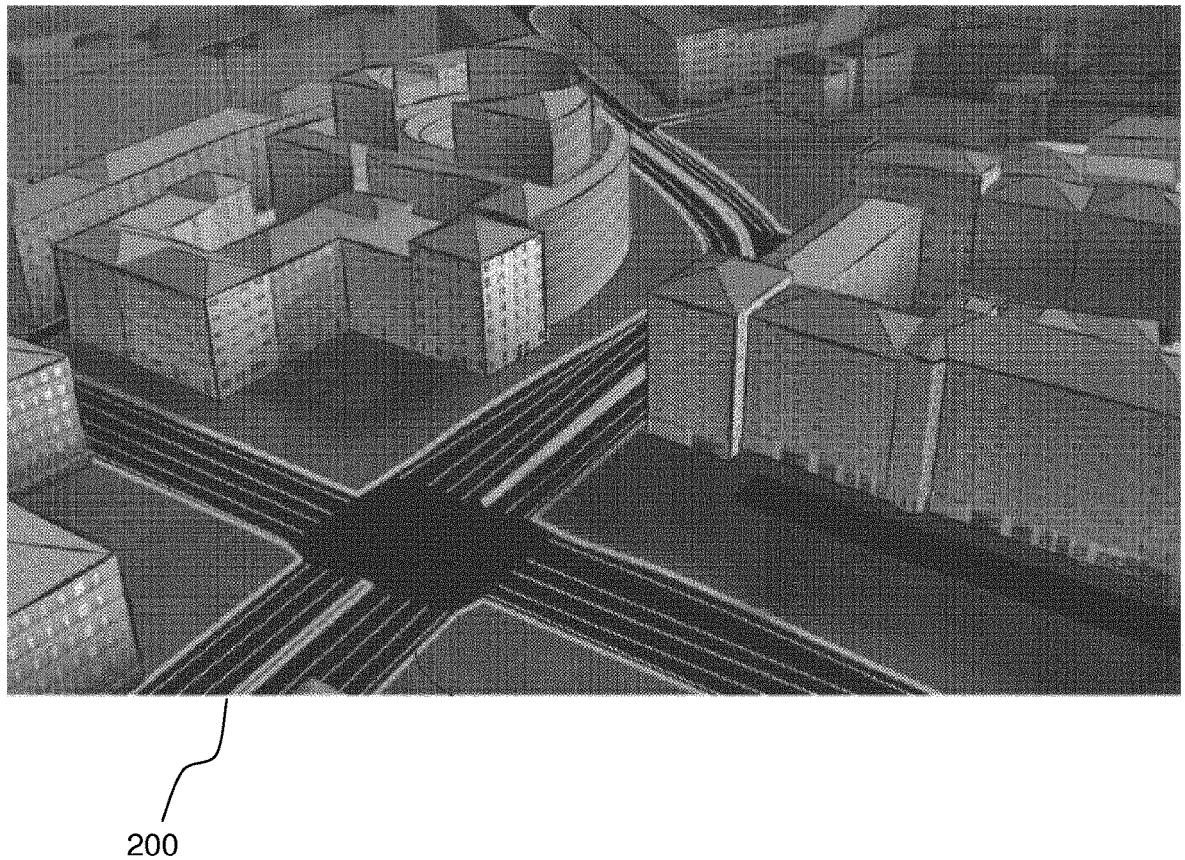
FIG. 2 displays a 3D-based view created by a driver assistance device using meteorological parameters in the prior art.

FIG. 2 displays a 3D-based view created by a driver assistance device using meteorological parameters in the prior art.

The view 200 has been generated completely in 3D, for example using the method described by the patent application published under number US2014/0277939. Such a view is generated to display to the user a view of its environment based on instantaneous weather conditions. The view 200 is generated using 3D descriptions of the building and other elements of the environment of the user, and a description of weather conditions.

In the example of the view 200, a combination of 3D descriptions of road and buildings, and current weather conditions (in this example, the view is generated for clear weather at night time) allows providing a general overview of an environment, which is adapted to any weather conditions. Such view can be used for example in navigation devices.

However, prior art views such as the view 200 are very synthetic, and are not photorealistic: they do not show details of the environment, as do for example the view 110, 120 and 130.

FIGS. 3*a*, 3*b*, 3*c* and 3*d* display four examples of computing devices in a number of embodiments of the invention.

FIGS. 3*a*, 3*b*, 3*c* and 3*d* thus illustrate four different use cases of the invention. However, it shall be noted that the invention is not restricted to these four examples, and can be used for any application that could benefit of displaying images of a view at a desired view time and view position.

Figure 3A:
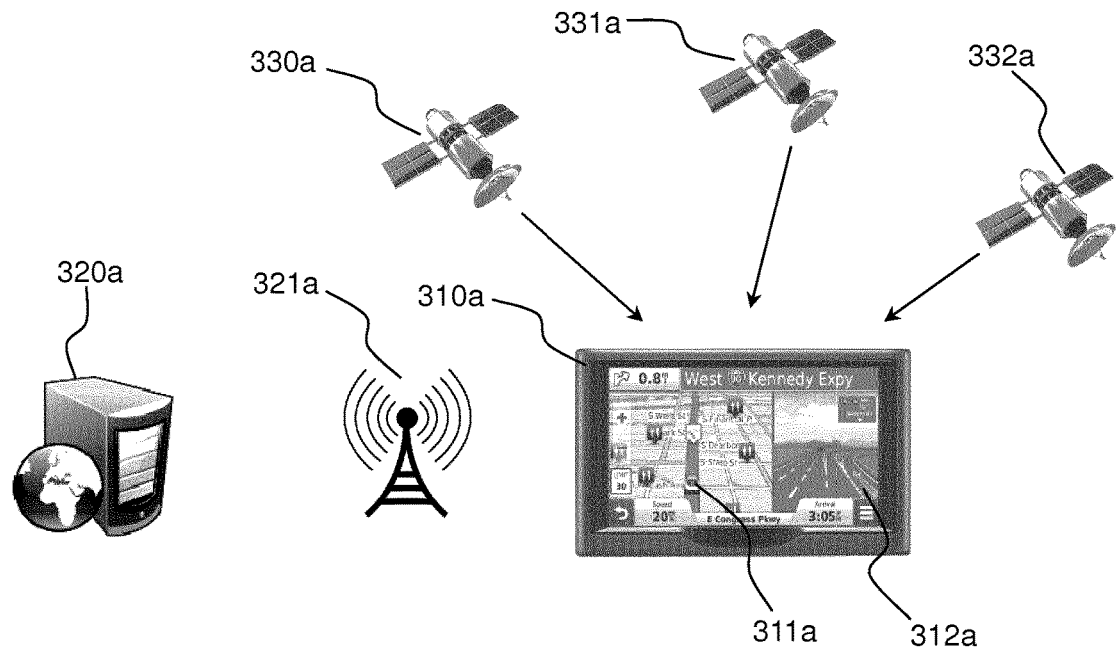
FIGS. 3a, 3b, 3c and 3d display four examples of computing devices in a number of embodiments of the invention.

FIG. 3*a* displays a first example of a computing device in a number of embodiments of the invention.

The device 310*a* is a navigation device, which calculates a localization of the user driving a car using signals from positioning satellites 330*a*, 331*a*, 332*a*, calculates a route 311*a* of the user to a destination, and displays to the user a view 312*a* of its environment with indications to follow the route 311*a* to the destination.

The device 310*a* is configured to retrieve a type of weather, in a group of weather types comprising: {rain, snow, sun, clouds}. Current conditions as well as hourly or daily forecast may be retrieved from services such as openweathermap.org. The device 310*a* may be configured to obtain the weather type either by connecting to a geo-referenced weather forecast service, or by using sensors onboard the car. The device 310*a* is further configured to retrieve a time of the day based on the view time, in a group comprising: {night, morning, noon, afternoon, evening}. The view as seen by the user in the car is dependent upon the time of the day, and the weather type. The weather type and time of the day thus form a set of image descriptors of the view defining how the first image should represent the view. These descriptors are provided by means of example only, and other descriptors may be used in various embodiments of the invention.

The device 310*a* is connected through a wireless data connection 321*a* to a server 320*a* which is configured to access a collection of images of views of a street for different view positions and view orientations. In order for the device 310*a* to display a view of the street as accurate as possible to the user, the device 310*a* sends to the server 320*a* a description of the position and the orientation of the view of the environment to display. The server is thus configured to retrieve an image corresponding to the view position and view orientation.

The image is modified by the server 320*a* or the device 310*a* in order to take into account the set of image descriptors of the view. This allows the display of a photorealistic image of the view by the device 310*a* to the user which is as representative as possible as the view he/she is looking at when driving. Thus, when route information is superimposed on the image of the view, the user is able to easily navigate along the road.

As will be explained in more details hereinafter, a number of different functional architectures can be used in the invention. For example, the image of the view can be retrieved by the server 320*a* in a database, modified by the server in order to take into account the set of image descriptors of the view, sent to the device 310*a* after having been modified, and displayed to the user. An image of the view can also be retrieved by the server 320*a* in a database, sent to the device 310*a*, and modified by the device 310*a* based on the set of image descriptors of the view. In certain embodiments of the invention, the server 320*a* has access to a database wherein each position/orientation is associated to a number of different images corresponding to different image descriptors of the view (for example, images at day/night, different seasons, weather conditions, etc. . . . ). The server 320*a* is thus configured to select an image which best suits the location, orientation, and set of descriptors, and to send this image to the device 310*a* to be displayed to the user.

The process of selecting images by the server 320*a*, sending them to the device 310*a* and displaying them to the user may be performed as and when the user is following the route, the device 310a sending to the server 320a instantaneous positions, orientations, and, if applicable, sets of descriptors corresponding to images to be immediately displayed. The device 310a can also buffer images, by requesting to the server 320a images in advance. These embodiments allow having the most accurate view of the environment of the user, because they adapt to the current locations and orientations of the user, and use accurate sets of descriptors.

It is also possible to load in the device 310a, as soon as a new route is detected, all the images that correspond to the route of the user. For each view, the view time can be estimated by calculating the time at which the user should have reached the view position, and the set of descriptors could be determined, by requesting a geo-referenced weather forecast service for obtaining a description of the future weather at each view time and view position. This allows benefiting from more efficient connections, for example a Wi-Fi connection if the user plans a new route at home, and having images of the environment available, even if the user is driving in an environment with limited connectivity. Streaming images that correspond to the route of the user may be achieved while en-route, over 3G, 4G, 5G or the like, or satellite communication link or any connection way provided by the car itself.

In any embodiment described above, if, for any reason, a photorealistic image of the environment of the user is not available, it can be replaced by a synthetic image. This allows the user having a view of its environment in any situation, and, if possible a photorealistic view.

The device 310a thus allows a user following a route accurately. Moreover, the device 310a displays to the user a photorealistic view of his/her environment, superimposed with route information. The user can thus navigate within the environment very easily and intuitively to follow the route.

Another possible use of the device 310a is to display an image of the view of the destination of the route, as it should appear at arrival time.

Figure 3B:
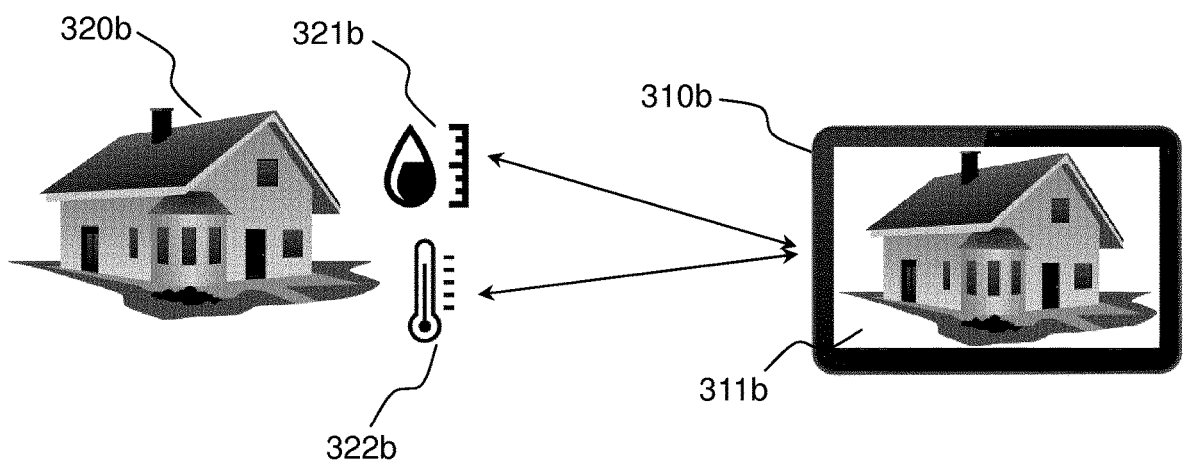

FIG. 3b displays a second example of a computing device in a number of embodiments of the invention.

The device 310b is configured to perform remote monitoring of a house 320b.

The house 320b is equipped with sensors, for example an outdoor hygrometer 321b, and an outdoor thermometer 322b. Other sensors can be used, for example indoor hygrometer/thermometer, a luminosity sensor, etc. The house 320b can be equipped with any sensor to perform measurements the user may be interested in. The device 310b is configured to display current values of the physical fields output by the sensors. This may be useful, for example to perform remote monitoring of a vacation home. In a number of embodiments of the invention, the device 310b may also be set to send commands to devices in the house, for example to start heating a vacation house before arriving.

The device 320b is further configured to display 311b to the user images of the house at different times. In order to do so, the user captures at least one image of the house using a camera. The image is captured in a capture condition (for example in summer, winter, under the sun or rain, etc. . . . ). The user may desire, at any time, to use the device to view the house as it would be at a view time. In order to do so, the device 320b is configured to determine, for a view time, a set of image descriptors of the view, based on measurements of the sensors in the house, and to modify the image accordingly.

In a use case, the user wishes to view the house as it would be now. The device 320b receives instantaneous measurements of sensors in the house, for example the outdoor hygrometer 321b, or the outdoor thermometer 322b, deduces instantaneous weather information based on the instantaneous measurements from sensors, and modifies a view of the house in order to match the instantaneous weather information.

For example, if measurements from the hygrometer 321b are representative of a rainy weather, and if the image has been captured in sunny weather, the device 320b is configured to modify the image in order to represent the house in rainy weather. The user may thus benefit of any view of the house that he/she has already captured under instantaneous weather conditions.

The device 320b is not restricted to modify images of a house, and could be used to modify images of any view the user may be interested in.

The user may also wish to have an overview of the house in the future or the past. In order to do so, the user can input the view time at which he/she wishes to view the house. For example, the user may wish to view the house in the future, for example the next week-end. The device 320b is configured to connect to a geo-referenced weather forecast service, in order to obtain values of the set of image descriptors of the view. For example, a weather report may be used to determine a number of descriptors such as for example the weather, season, or position of the sun, and modify the image accordingly. If the user wishes to view how the house looked in the past, for example in the last few days, past measurements from sensors, for example past measurements of the hygrometer 321b or the thermometer 322b may be used.

Figure 3C:
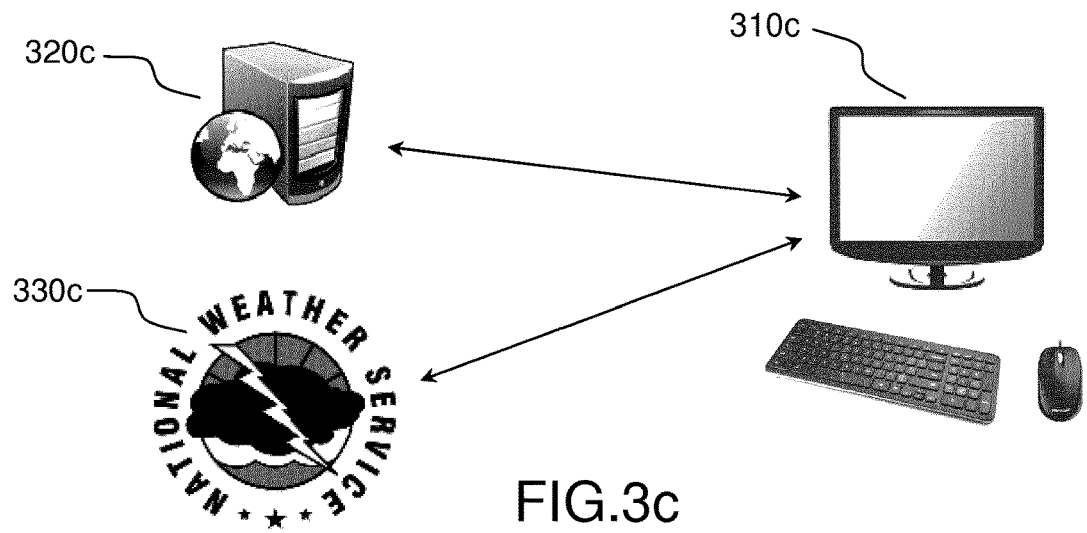

FIG. 3c displays a third example of a computing device in a number of embodiments of the invention.

The device 310c is a personal computer, which is connected to a server 320c having an access to a database of images, and a geo-referenced weather forecast service 330c. The user uses a street viewing service executed by the device 310c, in connection to the server 320c. The server 320c has access to a database of street images associated with positions and orientations, and sends images corresponding to the desired position/orientation to the device 310c.

Contrary to the street viewing service discussed with reference to FIG. 1, the device 310c does not display the latest available image of a position and an orientation, but an image that best matches a set of descriptors. As will be discussed in more details hereinafter, this can be achieved for example by modifying the images in the device 310c, modifying the images in the server 320c, or selecting, in a database of images, the image that best matches the set of descriptors.

In order to do so, the device 310c retrieves weather descriptors for a view time and view position corresponding to the current position that the user wishes to view from, from the weather service 330c. The user may either view the street as it would look like instantaneously, in the future or in the past.

Alternatively, the user can input directly the conditions in which he/she wishes to view the street. For example, he/she may wish to view the street in summer, winter, under sunny/rainy/snowy weather, etc. . . . .

Figure 3D:
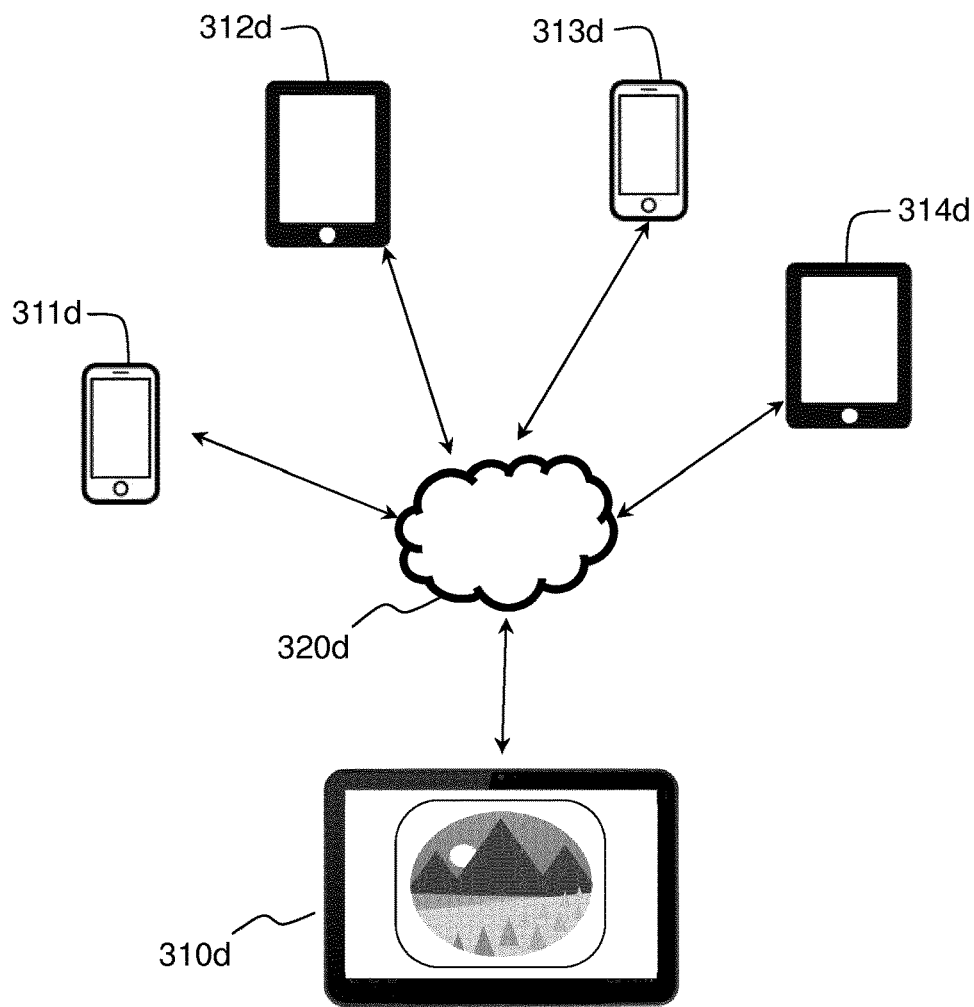

FIG. 3d displays a fourth example of a computing device in a number of embodiments of the invention.

The computing device 310d uses a cloud service 320d, which allows its connection to other devices, for example the devices 311d, 312d, 313d, 314d. The computing device 310d is a device equipped with a camera and computing, display and connection capabilities, for example a smartphone or a tablet. The device 310d is configured to execute an application to view positions defined by the user, either under instantaneous, future or past conditions. For example, the user may input to the applications command such as "view the Eiffel tower as it is now", or "view the place de la Vache Noire in Arcueil, France tonight".

The cloud service 320d rely on a large community of users, each user equipped with a computing device similar to the computing device 310d. The users of these devices usually take lots of pictures with the cameras of their device. These pictures can be geo-referenced and are usually associated to a date and time. All the devices using the cloud service 320d expose pictures to the cloud services. This allows the cloud service having a large, distributed database of geo-referenced images, often associated with a time and/or other information that have an impact on the view, such as weather conditions when the picture was taken.

When the user prompts the application to view an image of a position, the cloud service 320d determines which image, among all the images made available by the devices connected to the cloud service 320d, is the most relevant based on the inputs of the user. The selection of the most relevant image may be performed using one or more criteria comprising for example the position of the image (the images with a position as close as possible to the position input by the user being preferred), the date of the image (the most recent images being preferred) or the conditions in which the image was captured (the images corresponding to descriptors as similar as possible to the descriptors input by the user being preferred). The criteria above are not limitative, and other criteria may be used, as will be discussed in more details hereinafter.

Once the most relevant image is selected, the cloud service retrieves the image from the portable device in which it is stored, and sends the image to the device 310d. In addition, a set of image descriptors of the view is determined based on the view time and view position, in order to modify the image to match the weather conditions at the view time and view position. As will be discussed in more detail with reference to the FIGS. 4a to 4g, the image may be modified for example by the device 310d, the device in which it is initially stored, or by a server of the cloud service 320.

Thus, the device 310d, and the image viewing application, allows a user viewing images of a large number of locations, at virtually any time. The device 310d can benefit of a large database of images, captured all over the world by a large community of users. Moreover, the ability of the invention to modify the images in order to adapt their rendering to descriptors such as time or weather conditions allows the user of the device 310d to view all the images made available by the community of users for virtually any condition.

Alternatively, the user can input directly the conditions in which he/she wishes to view the image. For example, he/she may wish to view the image in summer, winter, under sunny/rainy/snowy weather, etc. . . . . The corresponding descriptors can thus be directly obtained, without deducing them from the view position and view time.

FIGS. 4a, 4b, 4c, 4d, 4e, 4f and 4g display seven examples of architectures of a user computing device in a number of embodiments of the invention.

Figure 4A:
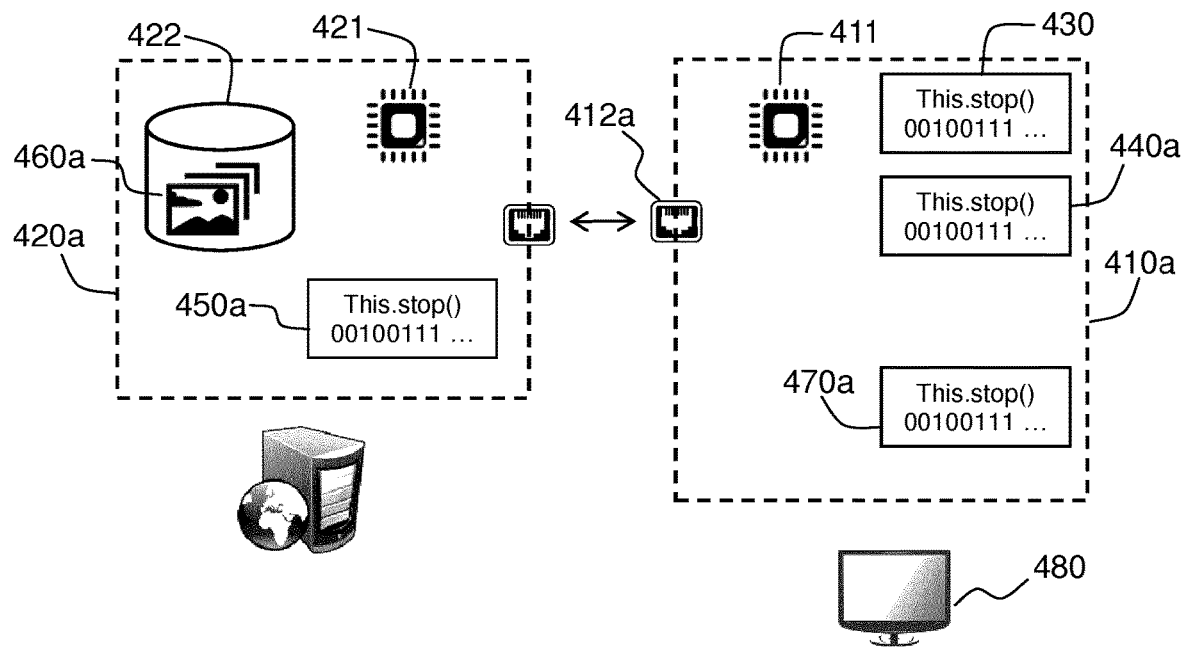
FIGS. 4a, 4b, 4c, 4d, 4e, 4f and 4g display seven examples of architectures of a user computing device in a number of embodiments of the invention.

FIG. 4a displays a first example of an architecture of a computing device in a number of embodiments of the invention.

The user computing device 410a is configured to display a first image representing a view to a user.

The user computing device 410a may be any user computing device equipped with processing capabilities. For example, the user computing device 410a may be a smartphone, a tablet, a navigation device, or a personal computer. The user computing device 410a may be configured to display the first image representing a view to the user for a large number of applications. For example, the user computing device 410a may be configured to execute one or more of a navigation application, a street viewing application, a photo sharing application, or more generally any application that involve displaying to the user one or more images of one or more views.

The user computing device 410a comprises a processor 411, and a first processing logic 430 configured to obtain a view position at which the first image should represent the view.

In the course of the present application, the view position may be any kind of information indicating the place corresponding to the view. It may be for example geographical coordinates, defined by a latitude and a longitude, and optionally an altitude. It may also be an address, or any kind of definition of a position. For example, a description such as "the Eiffel Tower" is considered as a view position, since it allows identifying a position without ambiguity.

In a number of embodiments of the invention, the first processing logic is further configured to obtain an orientation of the view. The orientation of the view may be expressed using any suitable representation. For example, the orientation may be expressed using 2D or 3D angles. The orientation may be expressed using compass points or cardinal directions (i.e North, East, North-West, etc. . . . ). The orientation may be also expressed using Euler angles or quaternions in a terrestrial frame of reference, or a frame of reference of the user. These embodiments are provided by means of example only, and, in embodiments of the invention making use of orientation, any representation of the orientation that allows determining without ambiguity the orientation of the view to display to the user can be used.

According to various embodiments of the invention, the first processing logic 430 is further configured to obtain a view time at which the first image should represent the view.

The view time may be any data that provides information relative to the time at which the user may desire to have the view displayed. For example, the view time may be a combination of date and time (for example, "August the $2^{nd}$, 4 μm.", or "November the $14^{th}$, 2016 at 4:30 p.m"). It may also be a time of the day (for example, 8:31 a.m, "at night", "at noon", etc. . . . ), any information relative to the time of the year (for example, "in winter", "in March", etc. . . . ) or a combination thereof (for example, "at noon in winter"). More generally, the invention is applicable to any representation of data providing information relative to the view time.

According to various embodiments of the invention, the first processing logic 430 may be the processor 411 operating in accordance with software instructions, a hardware configuration of the processor 411, or a combination thereof. It should be understood that any or all of the functions discussed herein may be implemented in a pure hardware implementation and/or by a processor operating in accordance with software instructions. It should also be understood that any or all software instructions may be stored in a non-transitory computer-readable medium.

More generally, in the course of the present application, the term processing logic may designate a processor operating in accordance with software instructions, a hardware configuration of the processor, or a combination thereof.

The view time and view position may be obtained in a number of different ways according to various embodiments of the invention. The view time and view position may be for example either calculated, retrieved by the user.

For example, in a navigation application configured to display a view at the arrival position at the arrival time, the view position may be defined by the user as the end of the route.

In a number of embodiments of the invention, the user manually inputs the view position and the view time. For example:
in the example described with reference to FIG. 3b, the user may provide inputs to view the house at any time (for example, now, tomorrow, this week-end, etc. . . . );
in the example described with reference to FIG. 3d, the user may provide inputs to view a place at a given time. For example, the user may provide inputs such as "View the Eiffel tower now", or "View Place de la Vache Noire in Arcueil, France, as it may be tonight.

In a number of embodiments of the invention, the view position is provided automatically by an application. For example, a street viewing application can be configured to calculate automatically a view position, and an orientation of the view as the user virtually drives or walks in a street, as explained for example with reference to FIG. 1. Meanwhile, the desired view time can be entered by the user. For example, the user may input times such as "Now", "Tonight", or "Tomorrow at noon".

In a number of embodiments of the invention, the first processing logic 430 is configured to calculate the view time at least based on the view position. For example, if the device 410a is a navigation device configured to display to the user a view of the destination of the route at arrival time, the first processing logic 430 may be configured to calculate the view time as the arrival time. In order to do so, the first processing logic 430 may be configured to calculate the view time as an arrival time. To do so, the processing logic can calculate a travel time based on an initial time, an initial position and a description of roads between the initial position and view position. The first processing logic 430 can be configured to use any known method of calculation of a travel time, route duration, or arrival time. The calculation of travel time may also use traffic information. In a number of embodiments of the invention, the calculation of travel time may use traffic information updated in real time, to update the view time, and adapt the first image accordingly. For example, if an initial calculation of travel time determines that the view time corresponds to dusk, the first image can represent the view at dusk; when the user is driving, a traffic jam may occur, that increases travel time. Upon reception of this information, the first processing logic may update the travel time, so that the view time is later, and the first image shall represent the view at night. The first image may thus be adapted, in order to permanently provide to the user a realistic view of the arrival position at arrival time.

The user computing device 410a further comprises a second processing logic 440a configured to obtain, a set of image descriptors of the view defining how the first image should represent the view.

The image descriptors of the view may be any kind of descriptor that provides qualitative and/or quantitative information regarding how the view should look like. According to various embodiments of the invention, the set of image descriptors of the view may comprise a number of different descriptors. For example, the set of image descriptors of the view may comprise one or more descriptors of:
Meteorological descriptors:
A weather type: for example, descriptors such as "rainy", "snowy", "cloudy", "sunny", "partly cloudy" or "partly sunny" may be used. In a number of embodiments of the invention, the descriptor can be associated with a level. For example, a descriptor of a "rainy" weather may be associated with a rain level, which may be expressed in a number of different scale, for example a percentage ranging from 0% (no rain) to 100% (very strong rain);
An air humidity (for example an absolute or relative humidity);
An air pressure, expressed for example in hPa or mbars;
An air temperature, expressed for example in ° C., ° K or ° F.;
A wind speed, expressed for example in kph;
A wind direction, expressed for example using cardinal directions, or true north-based azimuth degrees;
A precipitation level, for example an instantaneous rainfall rate, or an instantaneous snowfall rate, which may be expressed for example in cm/h (centimeter per hour), or in/h (inch per hour);
A concentration of one or more analytes in the air. For example, concentrations of one or more of $SO_2$, $NO_2$, $O_3$, CO may be considered;
A level of solar radiation (expressed for example in $kW/m^2$);
A sun position, expressed for example using ecliptic, equatorial, horizontal or rectangular horizontal coordinates;
A moon position, expressed for example using ecliptic, equatorial, horizontal or rectangular horizontal coordinates;
Descriptors related to human activity or events:
An ambient light hue. This may be representative of the hue of the lights that are used in a city/position;
An ambient light saturation. This may be representative of the saturation of the lights that are used in a city/position;
Traffic predictions and, optionally, type of vehicles (e.g. boats, cars, buses, trucks, airplanes, UAVs);
A building or road works. This may for example be represented by a description of a position and type of road works;
A social event. This may be representative of any social event which occurs in a place. This may designate as well a social event of very limited duration (for example one day or less, such as for example a strike, a soccer match), or longer-lasting social event, such as for example a circus, a fairground, or an exposition.
Descriptors related to natural and environmental conditions:
An ambient light hue. This may be representative of the hue of sunny conditions reflecting on water such as a lake or the sea;
Shadow of natural elements such as mountains, trees or vegetation;
Audio descriptors:
Noise and sound information (e.g. rain sound, muttered sound for snow condition, wind sound);
Human activity or event associated sounds (e.g., human crowd sound, vehicle sound);
Video or animated images descriptors:
Meteorological animations such as rain and winds;

Human activity such as moving crowd or vehicles;
Nature animation such as moving foliage.

More generally, the invention is applicable to any kind of image descriptor of a view.

According to various embodiments of the invention, descriptors of the set of descriptors can be obtained in a number of different ways.

In a number of embodiments of the invention, the set of image descriptors of the view are obtained through direct inputs of the user.

In a number of embodiments of the invention, second processing logic 440a is configured to obtain the set of image descriptors of the view based on the view time and the view position.

In a number of embodiments of the invention, the user computing device 410a comprises one or more communication ports to services providing timed, geo-referenced predictions of image descriptors of the view, and said second processing logic 440a is configured to receive one or more meteorological descriptors using said one or more communication ports based on the view time and the view position.

For example, the user computing device 410a can be linked/associated to a weather forecasting device, and one or more meteorological descriptors can be obtained using the weather forecasting device. For example, the second processing logic 440a can be configured to retrieve from the weather forecasting service a weather type and a precipitation level, at the view time and view position.

In some embodiments of the invention, second processing logic 440a is configured to calculate one or more meteorological descriptors. For example, the second processing logic 440a can be configured to calculate the position of the sun and/or the position of the moon for the view position and view time. It can also be configured to use mean or predefined values of meteorological descriptors for a period of the year. For example, the second processing logic 440a can be configured to retrieve an average value of a meteorological descriptor from a database. This applies to any kind of meteorological descriptors, such as average rainfall, average temperature, average humidity, at a period of the year for at the view position. For example, if the first image should represent the view in January in Brest, Brittany, France, a set of descriptors representative of rainfall, temperature and humidity in January in Brest can be retrieved from a database of historical values.

In a similar manner, the user computing device 410a can be connected to services providing information relative to human activities. For example, the second processing logic 440a can retrieve from a number of different services descriptors such as:
  Ambient light hue and ambient light saturation of the public lighting service of a city at the view position;
  Traffic predictions for the view time and view position;
  Building or road works;
  Social events.

In a number of embodiments of the invention, the user computing device 410a comprises one or more communication ports to external sensors associated with the view, and the second processing logic 440a is configured to receive one or more image descriptors of the view using said one or more communication ports.

This allows directly receiving values from sensors that provide suitable values of image descriptors of the view. Sensors can be associated to the view in a number of different ways. For example, they may be manually associated to the view by the user, associated automatically by an application, or detected as the closest suitable sensors. The sensors can thus be selected automatically, as example, the sensors that are close to the view. This embodiment can be used for example for the use case described with reference to FIG. 3b, wherein the hygrometer 321b, and the thermometer 322b provide instantaneous measurements of descriptors (respectively humidity and temperature) that impact the view of the house 320b.

The user computing device 410a comprises a communication port 412a to communicate with one or more servers 420a. The communication port 421a may be any kind of communication port allowing a communication with a server. The communication port 412a may be formed of a physical port (such as an Ethernet, a Wi-Fi or a 3G communication port), a wireless port, a software port, or a combination thereof. The communication with the one or more servers 420a may comprise any kind of wired or wireless connection.

The user computing device 410a is configured to send the view time and view position to the one or more servers 420a using said communication port 421a.

The one or more servers 420a comprise one or more memories 422 storing a collection of images, the images having associated therewith respective image positions. The respective image positions may be defined in a number of different ways, for example all the ways discussed in relation to the view position: the respective image positions may be any kind of information indicating the place corresponding to the image. It may be for example geographical coordinates, defined by a latitude and a longitude. It may also be an address, or any kind of definition of a position that unambiguously allows determining the position of images at the surface of Earth. For example, a description such as "the Eiffel Tower" is considered as a view position, since it allows identifying a position without ambiguity. Indeed, the exact position of the Eiffel Tower can be retrieved, for example in the form of latitude, longitude position. Therefore, a single tag "Eiffel Tower" is sufficient to define a position. Although a plurality of replicas of the Eiffel Tower have been built over the world, it shall be assumed, when descriptions of a monument are used and some replicas exist, that the description of the monument without other information designate the most famous or original monument. For example, the tag "Eiffel Tower" alone shall designate the original Eiffel Tower in Paris, while a tag providing additional information like "Eiffel Tower, Las Vegas" may designate replicas, in this example the Eiffel Tower of Las Vegas.

According to various embodiments of the invention, the collection of images 460a may be stored in a number of different forms. For example, it may be stored in a single server, a plurality of servers. Images may be simply stored in the one or more memories 422, or form a database. Any known way of storing images may be used, provided that it allows retrieving images and images features comprising at least respective images positions.

The collection of images 460a may be built in a number of different ways, possibly adapted to the application using the images. For example, for a street viewing application, the collection of images may be built by image captured by vehicles driving in the streets, while cameras capture images. This allows obtaining a large number of images of the streets, in order to be displayed by a street viewing application.

The one or more servers 420a comprise one or more processors 421, and a third processing logic 450a. The third processing logic 450a is configured to select, in the collection of images 460a, a second image representing the view based at least on the view position, and the respective images positions.

Selecting a second image based on the view position and the images positions allows obtaining a second image, which represents the view.

In a number of embodiments of the invention, the third processing logic 450a is configured to select the second image having the respective image position which is the closest to the view position.

In a number of embodiments of the invention, the images of the collection of images 460a have associated therewith other descriptors, the third processing logic 450a is configured to select the second image based on a combination of the view position, images positions and said other descriptors. The other descriptors may comprise one or more of:

The view orientation;

The date of capture the images;

One or more of the image descriptors of the view. The invention is applicable to any combination of the above to select the second image.

In a number of embodiments of the invention, the images of the collection of images 460a further have respective image orientations associated therewith, and the third processing logic 450a is also configured to select the second image based on a combination of the view position, the view orientation, respective images position and respective images orientations. This is useful for example for street viewing applications, in order to select the image that best matches both the view position and the view orientation, in order for the user to be able to perform rotations in the street view.

In a number of embodiments of the invention, images of the collection of images 460a have dates of capture associated therewith, and the third processing logic 450a is configured to use the date of capture to select the second image. More specifically, it may be configured to select one of the most recent images. The third processing logic 450a is thus configured to select the second image based on a combination of view positions, respective images positions, images capture dates, and/or other descriptors.

In a number of embodiments of the invention, the images of the collection of images 460a have respective image descriptors associated therewith, the second processing logic 440a is configured to send to the one or more servers 420a image descriptors of the view, the third processing logic 450a is configured to use image descriptors of the view, and respective image descriptors associated with images of the collection of images 460a to select the second image.

For example, the third processing logic 450a can be configured to select a second image having respective image descriptors associated therewith that indicate that it may be as similar as possible to the view. For example, if the descriptors that impact the view indicate that the first image shall be viewed in winter, the third processing logic 450a may be configured to select a second image that has a respective position that is close to the view, and represents the view in winter, if it exists. Similarly, the third processing logic 450a may be configured to select in priority a second image that has associated therewith weather conditions that best match the weather conditions defined by the set of image descriptors of the view. The same reasoning can be applied to the time of the day (favoring for example a second image at night if the set of descriptors that impact the view defines that the first image shall be viewed at night), traffic condition, or any descriptor that has an impact on the view.

In embodiments of the invention involving a number of different descriptors to select the second image, the third processing logic 450a can be configured to select the second image based on a combination of the descriptors. The descriptors can be merged for example in a single computed score, and the image that has the best score is selected. According to various embodiments of the invention, the weighted contributions of the different descriptors to the score can vary. For example, according to the application that is being used, the third processing logic 450a may be configured to select in priority images whose respective image position is very close to the view position, images that are captured in the same season, under the same weather conditions, etc. . . . . . In a number of embodiments of the invention, descriptors can be associated with a tolerance, and the second image is selected by first removing images associated with respective descriptors outside the tolerance, then selecting the image with the best score. For example, the third processing logic 450a can be configured to select only images that have a position in a radius of 10 meters around the view position, then the image that has the best score in a scale defined using closeness of weather and traffic descriptors.

Once the second image is selected, the one or more servers 420a is configured to send the second image to the user computing device 410a. The user computing device 410a comprises a fourth processing logic 470a. The fourth processing 470a is configured to create the first image representing the view based at least on the second image representing the view.

In a number of embodiments of the invention, the fourth processing logic 470a is configured to create the first image by copying the second image. The fourth processing logic 470a may also be configured to create the second image by modifying the first image. For example, the fourth processing logic 470a may be configured to apply a number of different effects (resizing, zoom, modification of colors, intensity, contrast, etc. . . . ) to the second image to obtain the first image.

The fourth processing logic 470a is further configured to modify the first image using the set of image descriptors of the view. This allows the first image to represent the view in order for the image to be as close as possible to whatever view might be expected under the defined set of image descriptors of the view.

Thus, the first image is photorealistic, because it is based on the second image from the collection of images 460a. The second image could be a capture of the view by a camera, or a modification thereof. Thus, the first image, which is created from the second image, also allows a photorealistic rendering. Meanwhile, the modification of the image based on the set of image descriptors of the view allows creating a first image that represents the view as it should look like at the view time. Thus, the invention advantageously allows, with a limited number of input parameters, to represent a large number of different views, how they should look like at view time, with a photorealistic rendering. Meanwhile, it is not necessary to store the images of the views for all the possible values of descriptors. Thus, the invention allows representing the view for a large number of descriptors, while limiting the storage needed to store the collection of images 460a.

According to various embodiments of the invention, the modification of the first image can be performed in a number of different ways.

For example, a modification of the image based on a weather descriptor can be performed by:

Separating a foreground and a background representing the sky of the first image;

Replacing the background by a background representative of the desired weather (rain, snow . . . );

Applying an effect to the foreground in relation to the weather (for example, if the set of image descriptors of the view define a cloudy weather, colors of foreground may be darkened, while, if the set of image descriptors of the view define a sunny weather, the colors of the foreground may be lightened.

In a number of embodiments of the invention, a modification of the image based on a descriptor representative of human activity can be performed at least by adding in the first images sub-images representative of a human activity. For example, if a descriptor is representative of an intensity of traffic, the fourth processing logic 470a may be configured to calculate a density of cars corresponding to the traffic descriptor, and superimpose cars according to the density of cars in the foreground of the first image. Similarly, if the descriptor of the view indicates that an exhibition is being held at the view position, images of the exhibition may be superimposed on the walls of buildings.

If the view is to be represented at night, the fourth processing logic 470a may be further configured to detect the position of public lighting, and display cones of light under public lights. If descriptors representative of the hue and/or saturation of public light at the view location are available, the cones of lights may be represented with the relevant colors.

The advertising displayed on the giant screens in the street may optionally be updated, taking into account the date of the requested view.

It should be understood that these examples of modification of the first image are not limitative: the first image may be modified in any suitable manner based on the set of image descriptors of the view, and the skilled person may use, for each descriptor a relevant modification of the first image. The modifications of the first image may notably consist in:

Adding elements to the image, for example vehicles to represent traffic or weather (rain, snow . . . );

Modifying shades to simulate the position of the sun;

Adding or removing lights in order to display the view in night or day;

Modifying global characteristics of the image, such as a global brightness, saturation or contrast, in order to represent the variations of ambient lights, which are due to the different of time or weather that impact the view.

In some cases, a still image, although providing a first overview of a place, is not sufficient to provide to a user an immersion sensation, for example the sensation that it is raining. In order to provide an immersion sensation, the modification of the first image may consist in adding dynamic elements such as:

Adding audio elements, especially if the user is using an immersive imaging device such as an Augmented Reality Display or a Virtual Reality Display;

Adding video information or image animations to add more realistic and dynamic rendering of the conditions at the location (such as dedicated advertising at a stadium during a specific event).

The first image may also be modified to be an animated image, such as a so-called gif image. Such animated image may be used to represent a view with moving elements in the forefront such as falling rain or falling snow. The first image may also be part of a first set of images that form an animation. This may be performed either by performing a plurality of modifications of the second image to create the first set of images forming an animation. For example, the plurality of transformation may consist in generating a falling rain or falling snow effect on a plurality of images forming the first set. Another option is that the second image is part of a second image set that already forms an animation, for example a falling rain animation. Thus the second set of images can be selected, and each image of the second set transformed on the same principle as explained above, to form the first set of images. The first, and second set of images may be either found in the form of successive still images, or videos.

The user computing device 410a further comprises a link to a screen 480 configured to display the first image to the user. According to various embodiments of the invention, the screen 480 may be either an internal screen, which is embedded within user computing device, or an external screen associated to the device. Although the device 410a is represented with a link to a screen, this example is not limitative and provided by means of example only of a display means. According to various embodiments of the invention, other kinds of display means may be used, such as a video projector, virtual reality device, hologram or smart glasses. The device may be associated to the display means by any suitable association mean, for example a connection.

The user computing device 410a thus allows the user to have a representation of a first image representing the view that takes into account the image descriptors of the view. Moreover, the user computing device 410a benefits of a large collection of images 460a in order to select the most accurate image to represent the view, and is configured to modify this image in order to best match the image descriptors of the view. The user computing device 410a thus allows the user having access to a very accurate representation of the view.

Figure 4B:
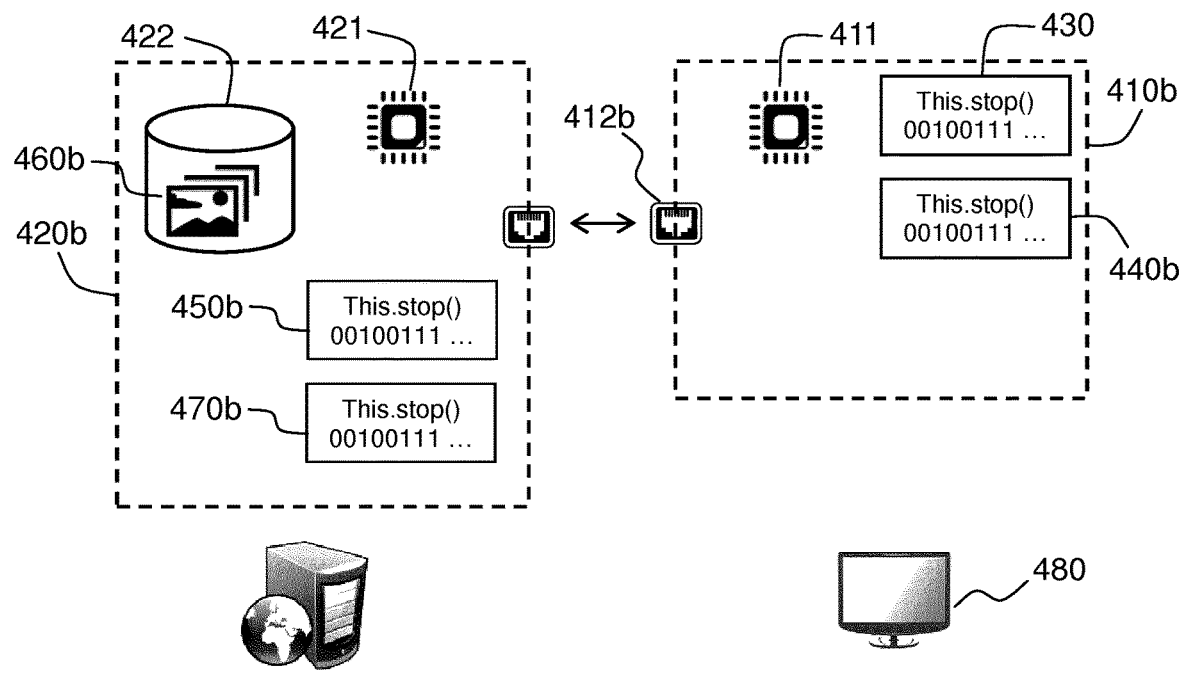

FIG. 4b displays a second example of architecture of a computing device in a number of embodiments of the invention.

The user computing device 410b comprises:
the processor 411;
the first processing logic 430;
a second processing logic 440b configured to obtain a set of image descriptors of the view;
and is associated to the screen 480.

The user computing device is equipped with a communication port 412b to communicate with one or more servers 420b that comprise:
the processor 421;
one or more memories 422 storing a collection of images 460b, said images having associated with image positions;
a third processing logic 450b configured to select, in the collection of images 460b, said images having associated with image positions, a second image representing the view based at least on the view position, and the images positions;
a fourth processing logic 470b configured to create said first image representing the view based at least on said second image representing the view and modify said first image representing the view using the set of image descriptors of the view.

Thus, the first image is created and modified by the one or more servers. The user computing device 410b uses the communication port 412b to send to the one or more servers 420b the view time, view position, and set of image descriptors of the view. The one or more servers 420b select the second image, create and modify the first image in order that it represents the view as impacted by the set of descriptors, and send the first image to the user computing device 410*b*. The user computing device receives and displays the first image.

Figure 4C:
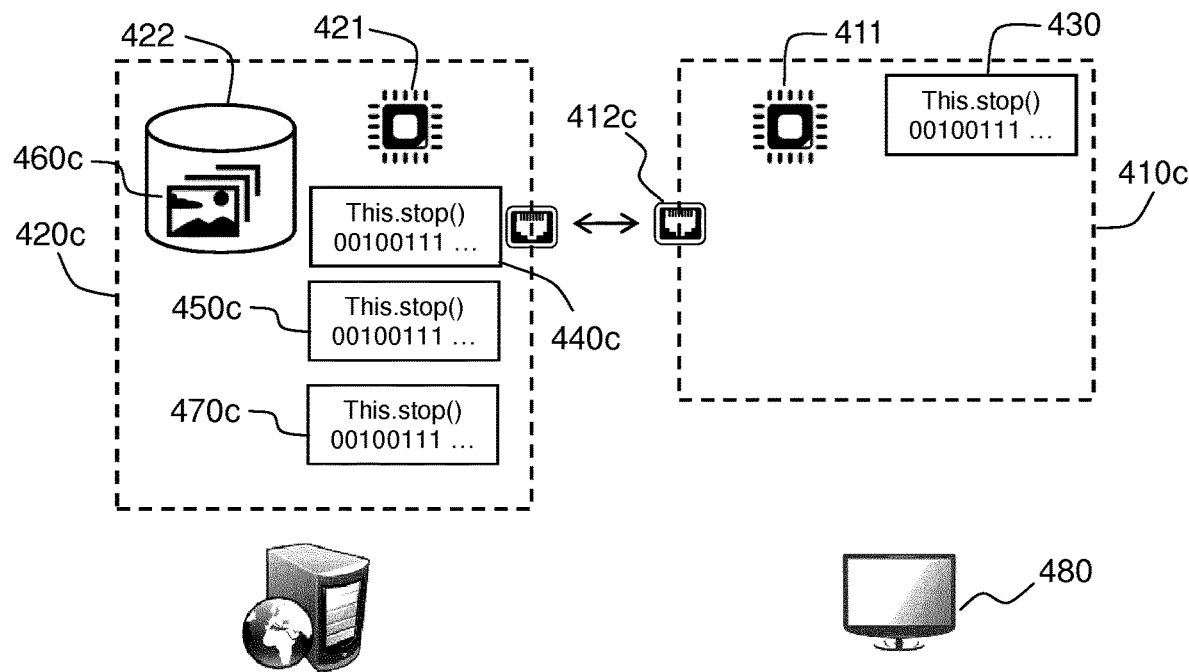

FIG. 4*c* displays a third example of architecture of a computing device in a number of embodiments of the invention.

The user computing device 410*c* comprises:
the processor 411;
the first processing logic 430;
and is connected to the screen 480.

The user computing device is equipped with a communication port 412*c* to communicate with one or more servers 420*c* that comprise:
the processor 421;
one or more memories 422 storing a collection of images 460*c*, said images having associated image positions. The association of image positions to images shall be performed explicitly, for example by embedding metadata comprising the image position within each image file, or storing position information within a database of images;
a second processing logic 440*c* configured to obtain a set of image descriptors of the view;
a third processing logic 450*c* configured to select, in the collection of images 460*c*, said images having associated image positions, a second image representing the view based at least on the view position, and the images positions;
a fourth processing logic 470*c* configured to create said first image representing the view based at least on said second image representing the view, and to modify said first image representing the view using the set of image descriptors of the view.

The user computing device 410*c* uses the communication port 412*c* to send to the one or more servers 420*c* the view time, view position. The one or more servers 420*c* obtain the set of image descriptors of the view, select the second image, create and modify the first image in order that it represents the view as impacted by the set of descriptors, and send the first image to the user computing device 410*c*. The user computing device receives and displays the first image.

Figure 4D:
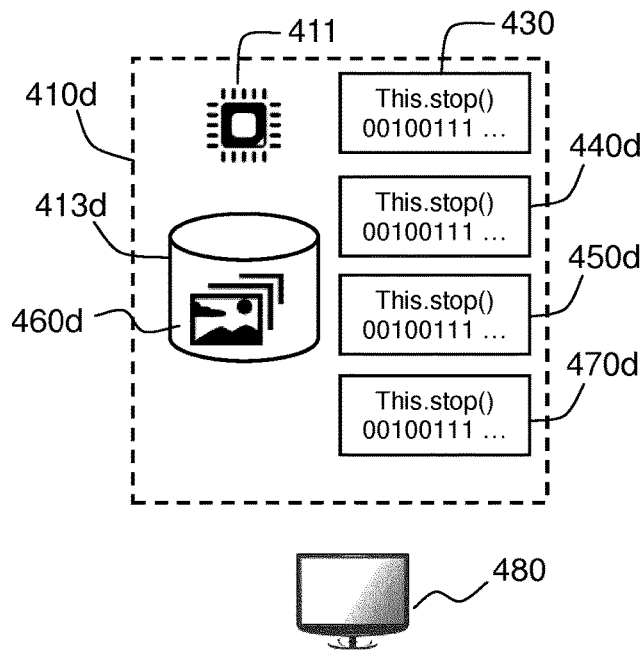

FIG. 4*d* displays a third example of architecture of a computing device in a number of embodiments of the invention.

The user computing device 410*d* comprises:
the processor 411;
one or more memories 413*d* storing a collection of images 460*d*, said images having associated image positions;
the first processing logic 430;
a second processing logic 440*d* configured to obtain a set of image descriptors of the view;
a third processing logic 450*d* configured to select, in the collection of images 460*d*, said images having associated with image positions, a second image representing the view based at least on the view position, and the images positions;
a fourth processing logic 470*d* configured to create said first image representing the view based at least on said second image representing the view and modify said first image representing the view using the set of image descriptors of the view;
and is connected or associated to the screen 480.

The collection of images 460*d* to be used is thus located within the user computing device 410*d*. It may be for example images captured by a camera of the user computing device 410*d*, and associated with descriptors comprising at least the location at which the image was captured.

The user computing device is thus able, based on an input of view time and view position provided by the user, to obtain the set of image descriptors of the view, select the second image, create and modify the first image.

Figure 4E:
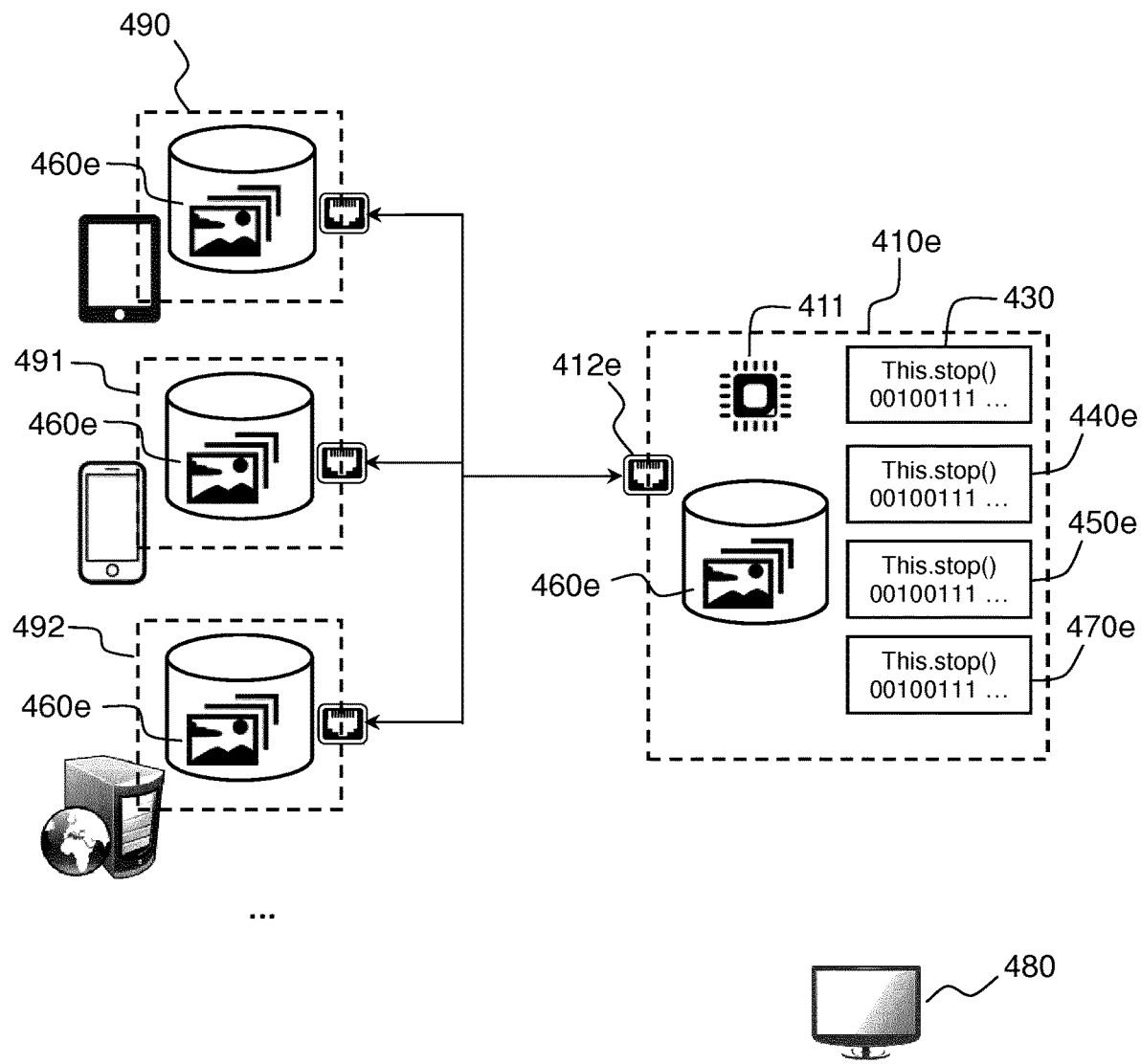

FIG. 4*e* displays a fifth example of architecture of a computing device in a number of embodiments of the invention.

The user computing device 410*e* comprises a communication port 412*e* to communicate with a plurality of devices 490, 491 and 492. A collection of images 460*e*, said images having associated with image positions, is located within memories shared within the plurality of devices 490, 491 and 492, and the user computing device 410*e*. Although three devices 490, 491 and 492 are represented in connection to the user computing device 410*e*, according to various embodiments of the invention, the user computing device 410*e* can be connected to a different number of devices.

The user computing device 410*e* further comprises:
the processor 411;
the first processing logic 430;
a second processing logic 440*e* configured to obtain a set of image descriptors of the view;
a third processing logic 450*e* configured to select, in the collection of images 460*e*, a second image representing the view based at least on the view position, and the images positions;
a fourth processing logic 470*e* configured to create said first image representing the view based at least on said second image representing the view and modify said first image representing the view using the set of image descriptors of the view;
and is connected to the screen 480.

The distributed nature of the collection of images 460*e* allows it to be enriched by an additional device connected to the user computing device 410*e*. The device can thus form a cloud of computing devices that share images.

The user computing device is thus able, based on an input of view time and view position provided by the user, to obtain the set of image descriptors of the view, select the second image in the collection of images 460*e*, that is to say any image that is shared by any of the devices which are connected to the user device 410*e*, create and modify the first image.

Figure 4F:
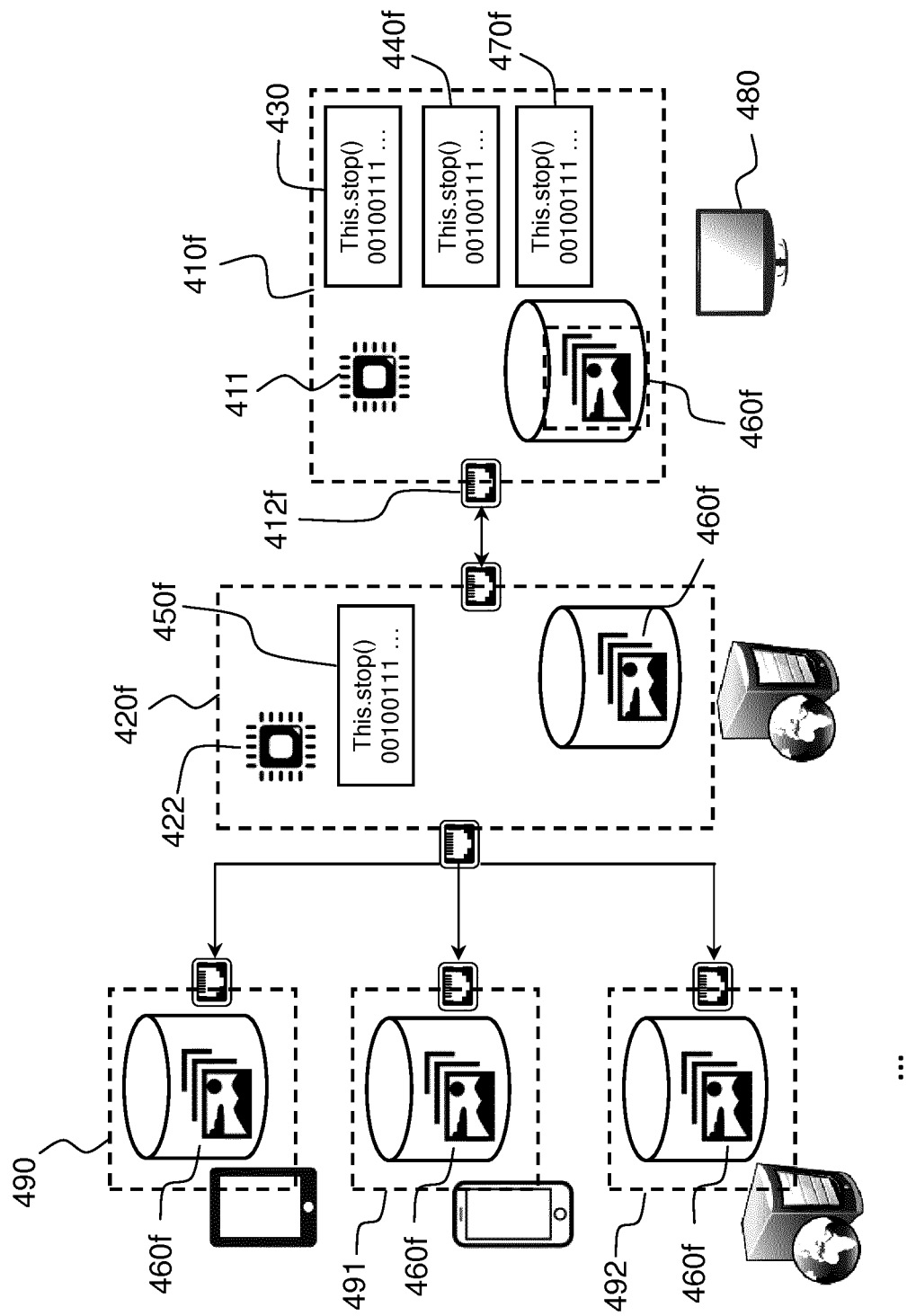

FIG. 4*f* displays a sixth example of architecture of a computing device in a number of embodiments of the invention.

The user computing device 410*f* comprises a communication port 412*f* to communicate with one or more servers 420*f*, which are themselves in connection with a plurality of devices 490, 491 and 492. A collection of images 460*f*, said images having associated image positions, is located within memories shared within the server 420*f*, plurality of devices 490, 491 and 492, and the user computing device 410*f*. Although three devices 490, 491 and 492 are represented in connection to the user computing device 410*f* and one or more servers 420*f*, according to various embodiments of the invention, the user computing device 410*f* can be connected to a different number of devices.

The user computing device 410*f* further comprises:
the processor 411;
the first processing logic 430;
a second processing logic 440*f* configured to obtain a set of image descriptors of the view;
a fourth processing logic 470*f* that creates said first image representing the view based on the second image representing the view and modify the first image representing the view using the set of image descriptors of the view.

The one or more servers 420f comprise a third processing logic 450f configured to select, in the collection of images 460f, a second image representing the view based at least on the view position, and the images positions.

The distributed nature of the collection of images 460f allows it to be enriched by additional devices connected or associated to the user computing device 410f. The device can thus form a cloud of computing devices that share images.

The user computing device 410f is thus configured to obtain the view time and view position, obtain the set of image descriptors of the view, and send at least the view time and the view position to the one or more servers 420f. The one or more servers are configured to select the second image in the collection of images 460f and send it to the user computing device 410f. The user computing device 410f is configured to create and modify the first image based on the second image and the set of descriptors.

Figure 4G:
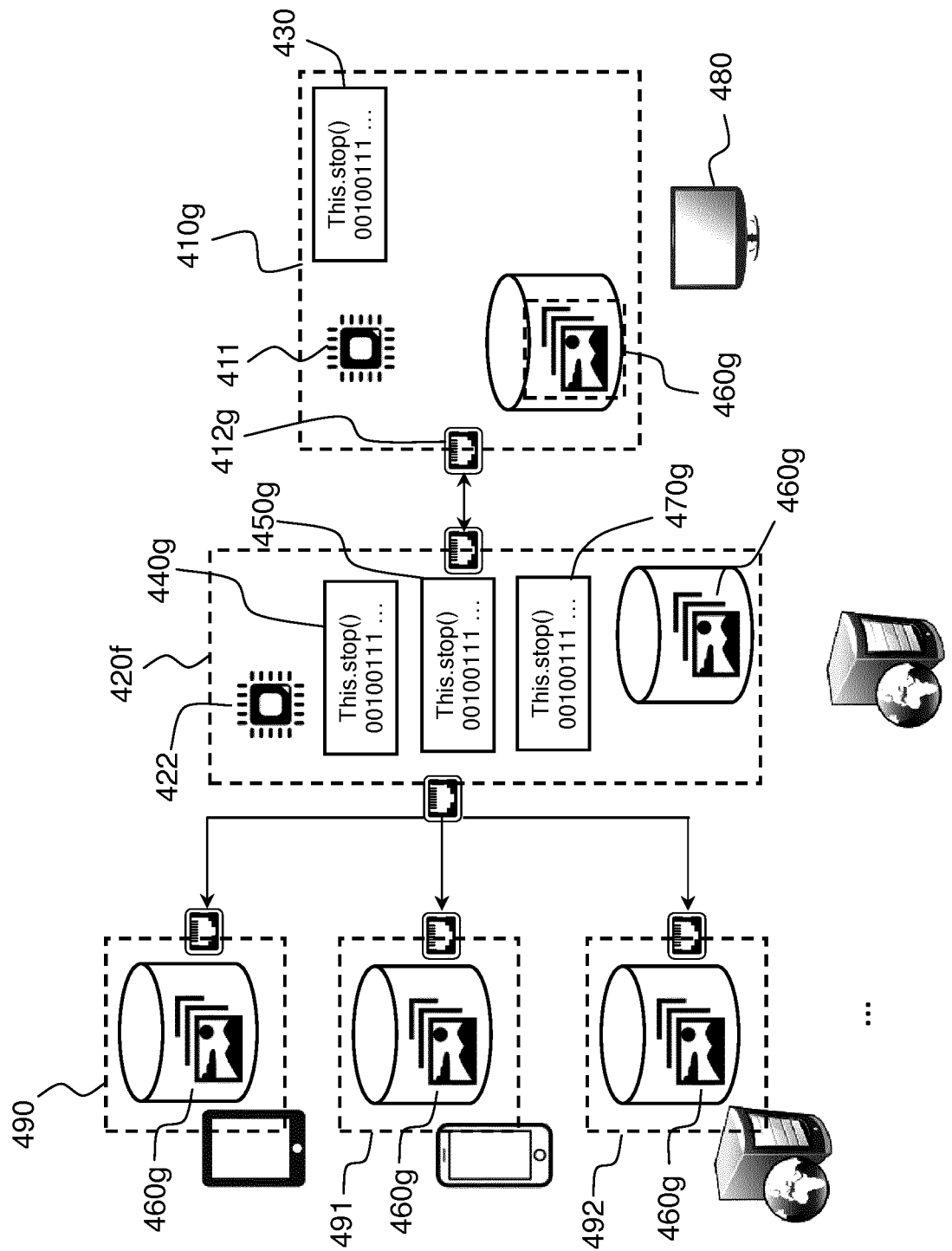

FIG. 4g displays a seventh example of architecture of a computing device in a number of embodiments of the invention.

The user computing device 410g comprises a communication port 412g to communicate with one or more servers 420g, which are themselves in connection with a plurality of devices 490, 491 and 492. A collection of images 460g, said images having associated with image positions, is located within memories shared within the server 420g, plurality of devices 490, 491 and 492, and the user computing device 410g. Although three devices 490, 491 and 492 are represented in connection to the user computing device 410g and one or more servers 420g, according to various embodiments of the invention, the user computing device 410g and one or more servers 420g can be connected to a different number of devices.

The user computing device 410f further comprises:
the processor 411;
the first processing logic 430;
The one or more servers 420g comprises:
a third processing logic 450f configured to select, in the collection of images 460g, a second image representing the view based at least on the view position, and the images positions;
a second processing logic 440g configured to obtain a set of image descriptors of the view;
a fourth processing logic 470g configured to create said first image representing the view based at least on said second image representing the view and modify said first image representing the view using the set of image descriptors of the view.

The distributed nature of the collection of images 460g allows it to be enriched by additional devices connected to the user computing device 410g. The device can thus form a cloud of computing devices that share images.

The user computing device 410g is thus configured to obtain the view time and view position, send the view time and the view position to the one or more servers 420g. The one or more servers 420g are configured to obtain the set of image descriptors of the view, and send at least the view time and the view position to the one or more servers 420g. The one or more servers are configured to select the second image in all the images of the collection of image 460g and send it to the user computing device 410g, create and modify the first image based on the second image and the set of descriptors, and send the first image to the user computing device 410g. The user computing device 410g is then configured to display the first image.

In certain circumstances, a single fixed image can provide only a limited insight of a number of effects. For example, a single image may not provide an impression of a falling rain, falling snow, or traffic jam.

In order to overcome this issue, in a number of embodiments of the invention, the fourth processing logic 470a-g is configured to create two or more images representing an animation of the view, and add on top of the two or more images one or more moving effects. The one or more moving effects comprise one or more of moving pedestrians, traffic jam, rain, snow, or wind.

This allows the user viewing the image with moving effects representative of descriptors representing a weather forecast or for instance, a human activity, thus rendering the display of the view more realistic.

In a number of embodiments, which are not displayed here, the images in the collection of images are associated with image descriptors of the view, and the third processing logic is configured to select a first image to be displayed in the collection of images. Meanwhile, these embodiments do not always need a fourth processing logic configured to create and modify the first image. Different embodiments are able to select the images based on image descriptors of the view, as already discussed above.

In these embodiments, the view time, view position, and image descriptors of the view can be obtained in any of the ways already discussed. However, in these embodiments the first image of the view to be displayed is selected directly in the collection of images and displayed, instead of being modified afterwards.

These embodiments thus rely on collections of images wherein a plurality of images of the same view are available, for a number of different values of image descriptors of the view. A plurality of images may be rendered available for the same view, either by capturing images of the view under a number of different conditions, or pre-calculating images by applying transformations corresponding to different values of the set of descriptors to images representative of each view.

The examples above are provided by means of examples only of potential architectures of a user computing device of the invention. However, other architectures of user computing devices are possible in the invention. In particular, any non-exclusive embodiments described above can be combined.

Figure 5:
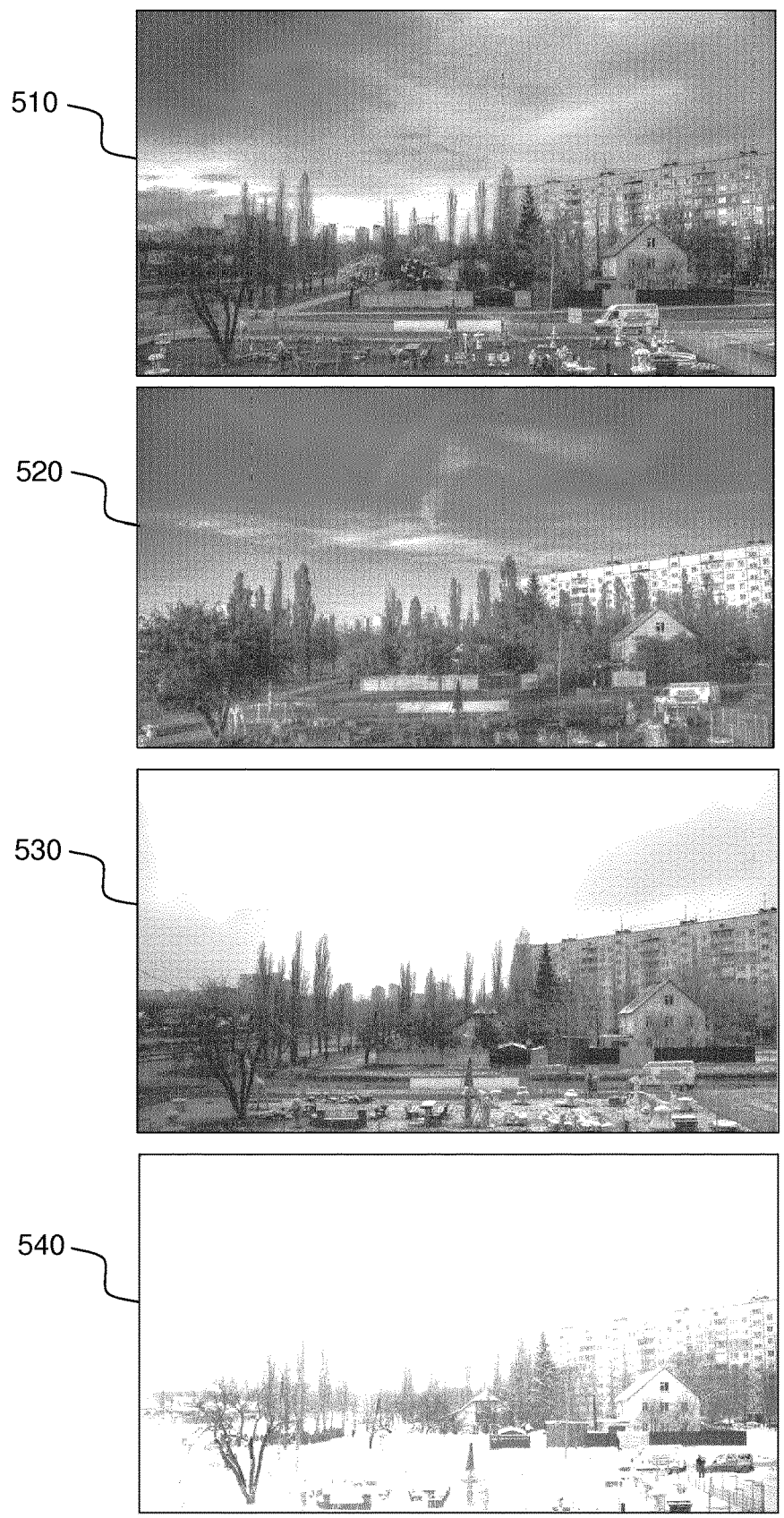
FIG. 5 displays four examples of image views in a collection of image views in an embodiment of the invention.

FIG. 5 displays 4 examples of image views in a collection of image views in an embodiment of the invention.

The images 510, 520, 530 and 540 all represent the same view, in different conditions:
Image 510 represents the view in spring, in the morning under partly cloudy weather;
Image 520 represents the view in summer, in the afternoon under sunny weather;
Image 530 represents the view in autumn, at noon, under cloudy weather;
Image 540 represents the view in winter, at noon, under snowy weather.

The images may have associated with a number of descriptors. In this example, each image has associated with 3 descriptors: the season, the time of day and weather. Thus, the four images have the following values of descriptors:
Image 510: {spring, morning, cloudy};
Image 520: {summer, afternoon, sunny};
Image 530: {autumn, noon, cloudy};
Image 540: {winter, noon, snowy}.

The images 510, 520, 530 and 540 represent the same view and thus have associated therewith the same view position, and, if applicable, view orientation. When selecting an image among the images 510, 520, 530 and 540, the third processing logic 450*a-g* may use image descriptors of the view obtained by the second processing logic 440*a-g*, and choose one of the images 510, 520, 530 and 540 based on said descriptors and the descriptors of each image.

As discussed above, a number of rules may be potentially used to select the most relevant image. In the example above, the third processing logic 450*a-g* may select the image to represent the view among images 510, 520, 530 and 540 based primarily on the season, the time of the day or the weather, or a combination thereof.

The example of the four images 510, 520, 530 and 540 provides an example of descriptors for choosing an image. However the invention is not restricted to this example and a number of other descriptors may be used, as discussed above with reference to FIG. 4*a*.

Figure 6:
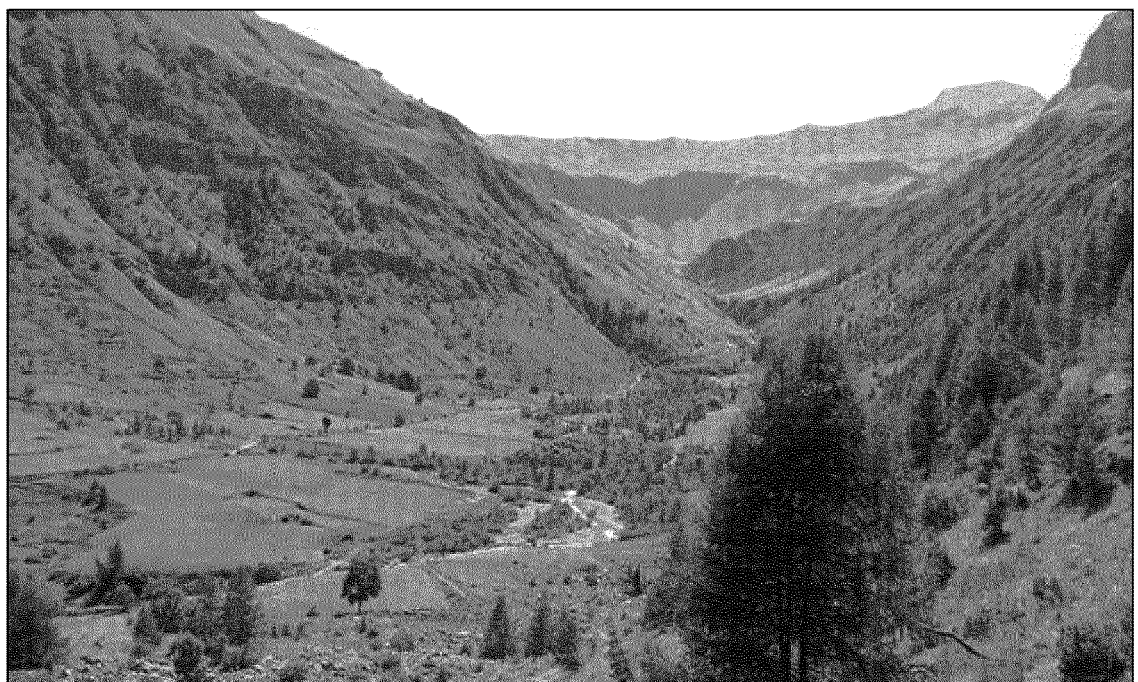
FIG. 6 displays an example of creation of an image representing a view in an embodiment of the invention.
Figure 6:
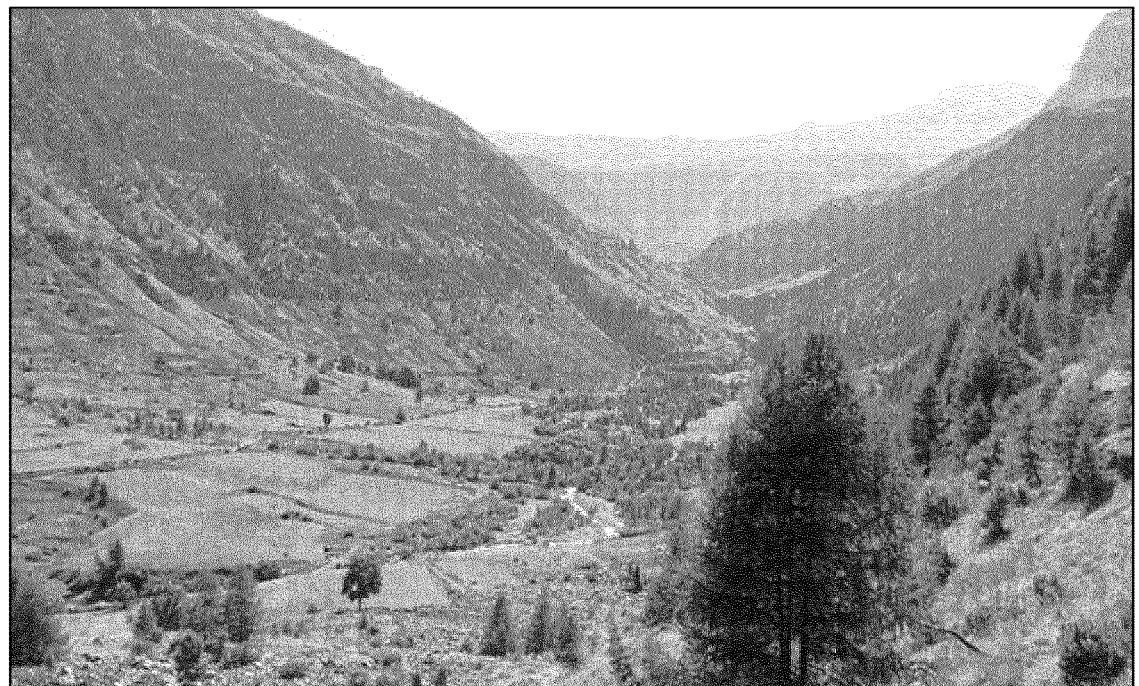

FIG. 6 displays an example of creation of an image representing a view in an embodiment of the invention.

In this example, the user desires viewing a valley in December. The second processing logic 440*a-g* is configured to determine, based on the position of the valley that the valley is usually under the snow. The third processing logic is configured to detect, based on the view position, that the collection of images 460*a-g* comprises a single image 610 of the valley. The third processing logic is thus configured to select the image 610 as the second image. The image 610 is a picture of the valley in summer. The image 610 has associated therewith a "season" descriptor stating that the image 610 represents the view in summer.

The fourth processing logic is thus configured to transform the second image 620 representing the view in summer, into a first image 620 representing the view in winter, by adding snow.

According to various embodiments of the invention, the modification of images based on image descriptors of the view may be performed in a number of different ways. By means of examples, this may be performed using one of the methods disclosed by:
  US patent application published under U.S. Ser. No. 09/695,100 that discloses a method to add a number of different effects on pictures;
  The publication Kang, L. W., Lin, C. W., & Fu, Y. H. (2012). *Automatic single-image-based rain streaks removal via image decomposition*. IEEE Transactions on Image Processing, 21(4), 1742-1755 that discloses a method to remove rain streaks, that can be used if the second image is rainy, and the image descriptors of the view indicate that the first image should not represent the view under rain.

These methods are provided by means of example only, and, according to various embodiments of the invention, the fourth processing logic may be configured to perform any suitable method to modify images according to one or more descriptors. For example, it may be configured to add vehicles in the street in order to simulate traffic.

Figure 7:
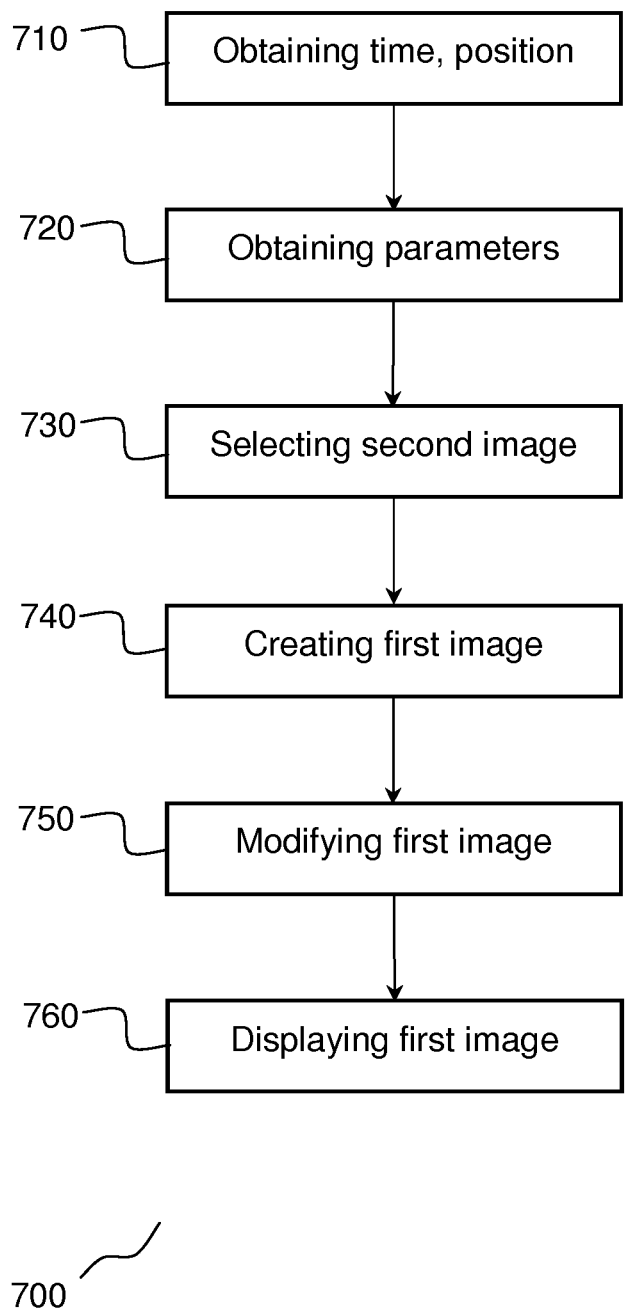
FIG. 7 displays an example of a method in a number of embodiments of the invention.

FIG. 7 displays an example of a method in a number of embodiments of the invention.

The method 700 is a method to display a first image representing a view.

The method 700 comprises a first step 710 of obtaining a view position at which the first image should represent the view.

The method 700 comprises a second step 720 of obtaining a set of image descriptors of the view.

The method 700 comprises a third step 730 of selecting, in a collection of images, said images having associated with image positions, a second image representing the view based at least on the view position, and the images positions.

The method 700 comprises a fourth step 740 of creating said first image representing the view based at least on said second image representing the view.

The method 700 comprises a fifth step 750 of modifying said first image representing the view using the set of image descriptors of the view.

The method 700 comprises a sixth step 760 of displaying said first image to the user.

All the embodiments which have been discussed previously in relation to the user computing devices of the invention are applicable to the method 700.

The examples described above are given as illustrations of embodiments of the invention. They do not in any way limit the scope of the invention, which is defined by the following claims.

The invention claimed is:

1. A system configured to display a first image representing a street-view, the system comprising:
  a cloud service including a database and a server, the cloud service communicably coupled to a plurality of portable smart computing devices, wherein the cloud service is configured to select a second image representing the street-view from among a collection of images, wherein the collection of images are provided by the plurality of portable smart computing devices, each image of the collection of images is associated with a respective image position and respective image descriptors; and
  a requesting computing device including a display, a processor and one or more communication ports in communication with the cloud service and at least one of a sensor and a weather forecast service, wherein the requesting computing device is configured to
    receive an input from a user relating to a view position at a view time, and
    wirelessly and directly acquire data relating to a weather condition at the view position and at the view time from the at least one of the sensor and the weather forecast service via the one or more communication ports, in response to the input from the user:
  wherein, in response to receiving the input from the user at the view time, the processor is configured to:
    obtain the view position at which the first image is to represent the street-view, wherein the view position includes information indicating a place corresponding to the street-view,
    obtain the one or more image descriptors of the street-view based on the data relating to the weather condition at the view position ad at the view time, wherein the one or more image descriptors define how the first image is to represent the street-view, and
    output the view position and the one or more image descriptors to the cloud service via the one or more communication ports,
    generate the first image representing the street-view based at least on the second image selected from the collection of images,
  wherein the cloud service is configured to:
    select the second image from among the collection of images based on the view position from the requesting computing device and the one or more image descriptors such that the second image has a view position closest to the view position input by the user and closest to the view time when the user inputs the view position to the requesting computing device, modify the second image to generate a modified first image based on the one or more image descriptors of the street-view from the requesting computing device, the respective image positions of each image in the collection of images, and the respective image descriptors of each image in the collection of images, such that the modified first image represents the street-view with environmental conditions including the weather condition closest to the view time when the user inputs the view position into the requesting computing device, output the first modified image to the requesting computing device via the one or more communication ports, and wherein the requesting computing device is configured to receive the first modified image and to display the modified first image via the display.

2. The system of claim 1, wherein the processor of the requesting computing device is further configured to obtain the view time at which the first image is to represent the street-view.

3. The system of claim 2, wherein the processor of the requesting computing device is further configured to calculate the view time based on an initial time, and a travel time to the view position calculated using an initial position, the view position, and a description of roads in between.

4. The system of claim 2, wherein the processor of the requesting computing is configured to obtain the one or more image descriptors of the view based on the view time and the view position.

5. The system of claim 1, wherein:
the cloud service is configured to store the collection of images obtained from the plurality of portable smart computing devices in the database.

6. The system of claim 1, wherein:
the one or more communication ports are configured to communicate with external sensors associated with the street-view, and the processor is configured to receive the one or more descriptors of the street-view from the external sensors via the one or more communication ports.

7. The system of claim 1, wherein:
the one or more communication ports are configured to communicate to services providing timed, geo-referenced predictions of image descriptors of the street-view, and
the processor is further configured to:
obtain the view time at which the first image is to represent the street-view, and
receive one or more meteorological descriptors using the one or more communication ports based on the view time and the view position.

8. The system of claim 1, wherein the processor is configured to:
create two or more images representing an animation of the street-view, and
add one or more moving effects to the two or more images representing the animation of the street-view.

9. A method to display a first image representing a street-view, the method comprising:
obtaining, by a requesting computing device, a view position input by a user at a view time and at which the first image is to represent the street-view, wherein the view position includes information indicating a place corresponding to the street-view;
wirelessly and directly acquiring, by the requesting computing device, data relating to a weather condition at the view position and at the view time, from at least one of a sensor and a weather forecast service, in response to receiving the input from the user;
obtaining, by the requesting computing device, one or more image descriptors of the street-view based on the data relating to the weather condition at the view position and at the view time, wherein the one or more image descriptors define how the first image is to represent the street-view;
outputting, by the requesting computing device, the view position and the one or more image descriptors of the street-view, to a cloud service;
selecting, by the cloud service, a second image representing the street-view from among a collection of images based at least on the view position and the one or more image descriptors, wherein the cloud service is in communication with a plurality of portable smart computing devices, the collection of images are provided by the plurality of portable smart computing devices, each image in the collection of images is associated with a respective image position and respective image descriptors, the second image having a view position closest to the view position input by the user;
generating the first image representing the street-view based at least on the second image selected from among the collection of images;
modifying the first image to generate a modified first image representing the street-view using the one or more image descriptors of the street-view such that the modified first image represents the street-view with environmental conditions including the weather condition closest to the view time when the user inputs the view position into the requesting computing device;
outputting, by the cloud service, the first modified image to the requesting computing device via a communication port of the requesting computing device; and
displaying, by the requesting computing device, the modified first image on a display.

10. The system of claim 1, wherein the plurality of smart computing devices include smartphones, tablets, or a combination thereof.

* * * * *